(12) United States Patent
Tsuchimoto et al.

(10) Patent No.: US 9,081,695 B2
(45) Date of Patent: Jul. 14, 2015

(54) NODE DETERMINING PROGRAM, NODE DETERMINING APPARATUS, AND NODE DETERMINING METHOD

(71) Applicant: FUJITSU LIMITED, Kawasaki-shi, Kanagawa (JP)

(72) Inventors: Yuichi Tsuchimoto, Kawasaki (JP); Toshihiro Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 334 days.

(21) Appl. No.: 13/628,774

(22) Filed: Sep. 27, 2012

(65) Prior Publication Data

US 2013/0132450 A1    May 23, 2013

(30) Foreign Application Priority Data

Nov. 22, 2011    (JP) .................................. 2011-255556

(51) Int. Cl.
*G06F 7/00* (2006.01)
*G06F 17/10* (2006.01)
*G06F 17/30* (2006.01)

(52) U.S. Cl.
CPC .......... *G06F 17/10* (2013.01); *G06F 17/30946* (2013.01); *G06F 17/30961* (2013.01)

(58) Field of Classification Search
CPC .......... G06F 17/18; G06F 17/10; G06F 7/02; G06F 9/30018; G06F 17/16
USPC ........................................................ 708/200
See application file for complete search history.

(56) References Cited

U.S. PATENT DOCUMENTS

| | | | |
|---|---|---|---|
| 8,677,003 B1 * | 3/2014 | Brashear ....................... | 709/231 |
| 2002/0038313 A1 * | 3/2002 | Klein et al. .................. | 707/200 |
| 2004/0010683 A1 * | 1/2004 | Huitema ....................... | 713/162 |
| 2004/0162953 A1 | 8/2004 | Yoshida et al. | |
| 2010/0138396 A1 | 6/2010 | Kikkawa | |
| 2011/0013639 A1 * | 1/2011 | Matthews et al. ........ | 370/395.32 |

FOREIGN PATENT DOCUMENTS

| | | |
|---|---|---|
| JP | 4068473 | 1/2008 |
| JP | 2010-134630 | 6/2010 |

* cited by examiner

*Primary Examiner* — Tan V. Mai
(74) *Attorney, Agent, or Firm* — Staas & Halsey LLP

(57) ABSTRACT

A computer-readable recording medium storing a program causing a processor to execute an operation, the operation includes associating a mathematical function of which a domain includes a key to uniquely specify data to be stored, with each node; associating an index value indicating an amount of the data, with each node; substituting the key in the mathematical function to calculate a value of the mathematical function; substituting the value of the mathematical function and the index value in a weighting function, of which a domain includes the value of the mathematical function and the index value, and in which a size relationship of values of the weighting function is defined in a range of the weighting function, to calculate a value of the weighting function for every node; determining a node in which the data is to be stored, based on the size relationship; and outputting the node.

10 Claims, 21 Drawing Sheets

FIG. 18

NODE/KEY CORRESPONDENCE LIST ~1800

| NODE ID | NODE NAME | KEY |
|---|---|---|
| N1 | n00 | "k02", "k05", "k06", "k09", "k16", "k17" |
| N2 | n01 | "k00", "k01", "k04", "k11", "k13", "k14", "k19" |
| N3 | n02 | "k02", "k03", "k04", "k05", "k06", "k07", "k12", "k14", "k15", "k18" |
| N4 | n03 | "k03", "k08", "k10", "k13", "k18", "k19" |
| N5 | n04 | "k00", "k01", "k07", "k08", "k09", "k10", "k11", "k12", "k15", "k16", "k17" |

NODE/KEY CORRESPONDENCE LIST ~1900

| NODE ID | NODE NAME | KEY |
|---|---|---|
| N1 | n00 | "k02", "k05", "k06", "k17" |
| N2 | n01 | "k00", "k04", "k11", "k13", "k14" |
| N3 | n02 | "k03", "k04", "k07", "k12", "k14", "k18" |
| N4 | n03 | "k03", "k08", "k10", "k18", "k19" |
| N5 | n04 | "k00", "k01", "k08", "k09", "k10", "k11", "k12", "k16", "k15" |
| N6 | n05 | "k01", "k02", "k05", "k06", "k07", "k09", "k13", "k15", "k16", "k17", "k19" |

NODE/KEY CORRESPONDENCE LIST ~2100

| NODE ID | NODE NAME | KEY |
|---------|-----------|-----|
| N1 | n00 | "k02", "k05", "k06", "k17" |
| N2 | n01 | "k00", "k01", "k04", "k11", "k13", "k14" |
| N3 | n02 | "k03", "k07", "k12", "k14", "k18" |
| N4 | n03 | "k03", "k08", "k10", "k17", "k18", "k19" |
| N5 | n04 | "k00", "k04", "k08", "k09", "k10", "k11", "k12", "k16", "k19" |
| N6 | n05 | "k01", "k02", "k05", "k06", "k07", "k09", "k13", "k15", "k16", "k19" |

NODE DETERMINING PROGRAM, NODE DETERMINING APPARATUS, AND NODE DETERMINING METHOD

CROSS-REFERENCE TO RELATED APPLICATION(S)

This application is based upon and claims the benefit of priority of the prior Japanese Patent Application No. 2011-255556, filed on Nov. 22, 2011, the entire contents of which are incorporated herein by reference.

FIELD

The embodiment discussed herein is related to a node determining program, a node determining apparatus, and a node determining method by which a node for storing data is determined.

BACKGROUND

In a certain kind of distributed data store, a node which stores data specified from a key differs for every key of data. There is a case where data of an identical key is redundantly stored in a plurality of nodes in a distributed data store from a viewpoint of failure resistance. Further, there is a case where the number of nodes in the distributed data store is dynamically increased or decreased without stopping service as a data store.

In such distributed data store, a node for storing data specified from a key is determined from a plurality of nodes for every key of data (so called, key space division). As a method of related art, there is such method that one hash function h( ) is determined and a hash value h(k) obtained by inputting a key "k" of data into the hash function h( ) is divided by the number of nodes so as to determine a node for storing the data by the remainder of the division.

As a technique of related art, there is such technique that weight is preliminarily set for every node and an identifier space handled by a node (a range of a hash value handled by a node, for example) is divided based on the weight, for example (refer to Japanese Laid-open Patent Publication No. 2010-134630, for example). As another technique of related art, there is such technique that a file is divided by a plurality of information processing apparatuses so as to maintain the divided file, for example (refer to Japanese Patent No. 4068473, for example).

SUMMARY

According to an aspect of the invention, an apparatus includes a computer-readable recording medium storing a program causing a processor to execute an operation, the operation includes associating a mathematical function differing for every node included in a plurality of nodes and, of which a domain includes a key to uniquely specify the data to be stored, with each node; associating an index value of each node, the index value indicating an amount of data to be stored, with each node; substituting the key in the mathematical function of each node so as to calculate a value of the mathematical function of each node; substituting the value of the mathematical function of each node and the index value of each node in a weighting function, of which a domain includes a combination of the value of the mathematical function of each node and the index value of each node and in which a size relationship of values of the weighting function is defined in a range of the weighting function, so as to calculate a value of the weighting function for every node; obtaining a determination result by determining a node in which the data is to be stored, based on the size relationship of the values of the weighting function of each node; and outputting the determination result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a diagram (I) illustrating a specific example 1 of stored contents of a node/key correspondence list;

DESCRIPTION OF EMBODIMENT

A node determining program, a node determining apparatus, and a node determining method according to a preferred embodiment of the present disclosure are described in detail below with reference to the accompanying drawings. According to the node determining program, the node determining apparatus, and the node determining method, data is distributed disproportionately among nodes in a distributed data store based on a specified index value, being able to reduce a data moving amount in increase/decrease of nodes.

According to the node determining program, the node determining apparatus, and the node determining method, a value which is obtained by correcting a mathematical function value (for example, a hash value) of every node, which is obtained from a key of data, by an index value which is set for every node is calculated. Further, according to the node determining program, the node determining apparatus, and the node determining method, a node for storing data is determined based on a size relationship of corrected values of every node.

According to the node determining program, the node determining apparatus, and the node determining method, data can be distributed disproportionately among nodes in the data store, in accordance with an index value which is set for every node. As a result, much data can be stored in a node exhibiting high performance on the points of storage capacity, computing power, line speed, and the like, being able to promote the efficiency of the distributed data store. In increase/decrease of nodes, the size relationship of corrected values of every node does not change among nodes other than an increased/decreased node, so that data does not move among nodes other than the increased/decreased node, being able to suppress the data moving amount in increase/decrease of nodes.

Figure 1:
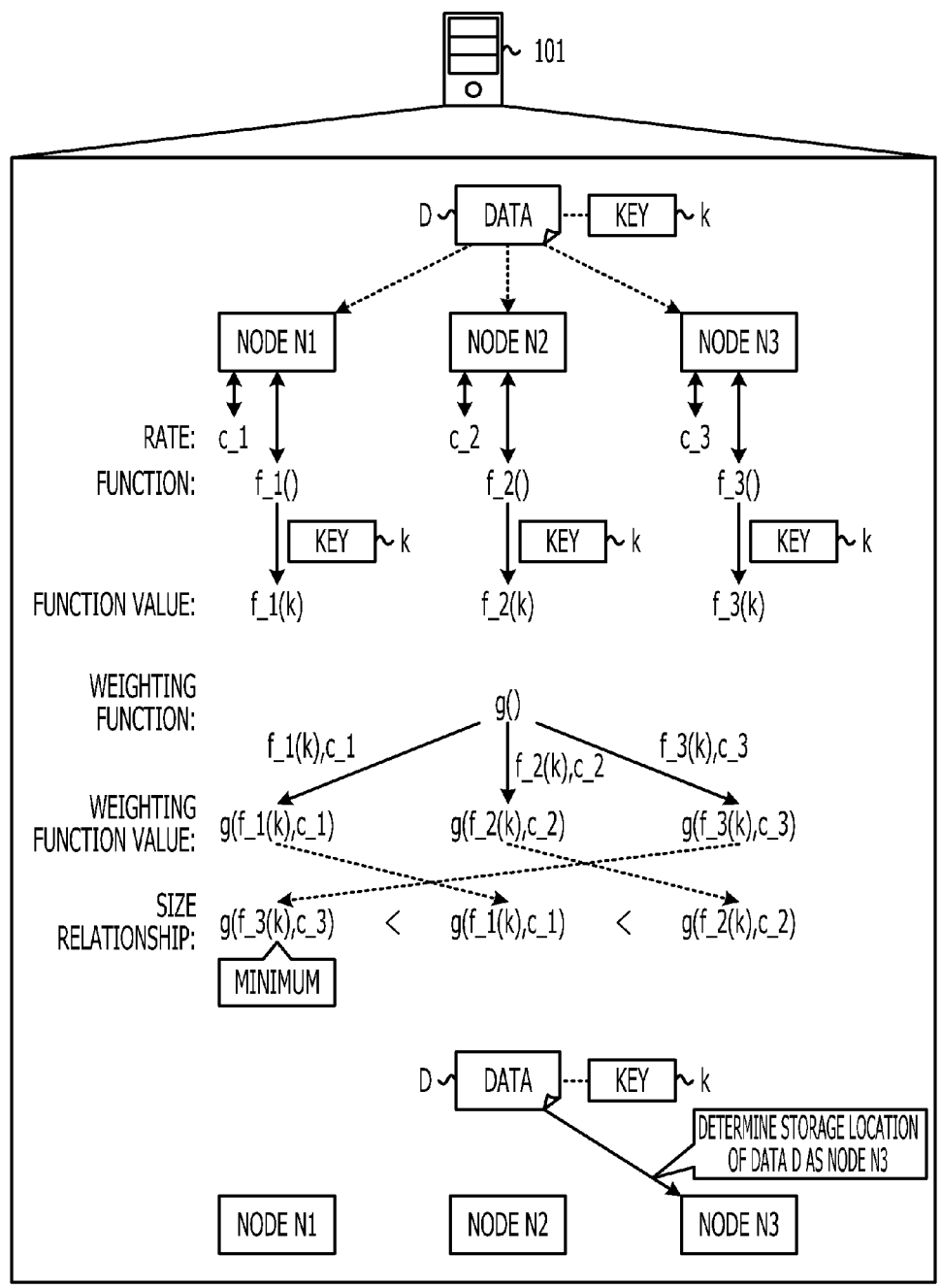
FIG. 1 illustrates an example of node determination processing of a node determining apparatus according to an embodiment.

FIG. 1 illustrates an example of node determination processing of the node determining apparatus according to the embodiment. Here, a case where a node in which data D is to be stored is determined from nodes N1 to N3 in a distributed data store is described as an example.

The distributed data store is a system which stores a data group in a manner to distribute the data group to a plurality of nodes (the nodes N1 to N3 in this example). In the distributed data store, data D is paired with a key k, and data D can be referred by specifying a key k. A key k of data D is information for uniquely identifying data D.

As depicted in FIG. 1, a node determining apparatus 101 first associates the node N1 with function $f\_1(\ )$. The node determining apparatus 101 associates the node N2 with function $f\_2(\ )$. The node determining apparatus 101 associates the node N3 with function $f\_3(\ )$. Here, the functions $f\_1(\ )$, $f\_2(\ )$, and $f\_3(\ )$ are functions which are different from each other and domains of the respective functions include a key k of data D.

Then, the node determining apparatus 101 associates the node N1 with rate $c\_1$. The node determining apparatus 101 associates the node N2 with rate $c\_2$. The node determining apparatus 101 associates the node N3 with rate $c\_3$. Here, the rates $c\_1$, $c\_2$, and $c\_3$ are index values indicating how much data is stored in the respective nodes N1 to N3 among a data group which is distributed to be stored in the nodes N1 to N3.

Then, the node determining apparatus 101 substitutes the key k of the data D in the functions $f\_1(\ )$, $f\_2(\ )$, and $f\_3(\ )$ of the respective nodes N1 to N3 so as to calculate function values $f\_1(k)$, $f\_2(k)$, and $f\_3(k)$ of the respective nodes N1 to N3.

Subsequently, the node determining apparatus 101 substitutes the function values $f\_1(k)$, $f\_2(k)$, and $f\_3(k)$ of the respective nodes N1 to N3 and the rates $c\_1$, $c\_2$, and $c\_3$ of the respective nodes N1 to N3 in a weighting function $g(\ )$.

Thus, the node determining apparatus 101 calculates weighting function values $g(f\_1(k),c\_1)$, $g(f\_2(k),c\_2)$, and $g(f\_3(k),c\_3)$ of the respective nodes N1 to N3.

Here, a domain of the weighting function $g(\ )$ includes combinations respectively between the function values $f\_1(k)$, $f\_2(k)$, and $f\_3(k)$ of the respective nodes N1 to N3 and the rates $c\_1$, $c\_2$, and $c\_3$ of respective nodes N1 to N3. The weighting function $g(\ )$ is a function of which a size relationship of values (weighting function values) is defined in a range of the weighting function.

Then, the node determining apparatus 101 determines a node in which the data D is to be stored based on the size relationship of the weighting function values $g(f\_1(k),c\_1)$, $g(f\_2(k),c\_2)$, and $g(f\_3(k),c\_3)$ of the respective nodes N1 to N3.

In this example, the node determining apparatus 101 determines the node N3 corresponding to the weighting function value $g(f\_3(k),c\_3)$ which is the minimum value among the weighting function values $g(f\_1(k),c\_1)$, $g(f\_2(k),c\_2)$, and $g(f\_3(k),c\_3)$, as a node in which the data D is to be stored.

According to the example described above, data movement among nodes can be reduced in increase/decrease of the number of nodes in the distributed data store. Specifically, even when the number of nodes in the distributed data store changes, the size relationship of the weighting function values of the nodes N1 to N3 does not change, being able to suppress an occurrence of data movement among nodes.

More specifically, when the number of nodes in the distributed data store is increased, for example, movement of data D does not occur unless a weighting function value of a node which is newly added becomes the minimum. On the other hand, when the number of nodes in the distributed data store is decreased, movement of data D does not occur unless the node N3 is deleted. Data movement among nodes in increase/decrease of the number of nodes is described with reference to FIGS. 2 and 3.

Figure 2:
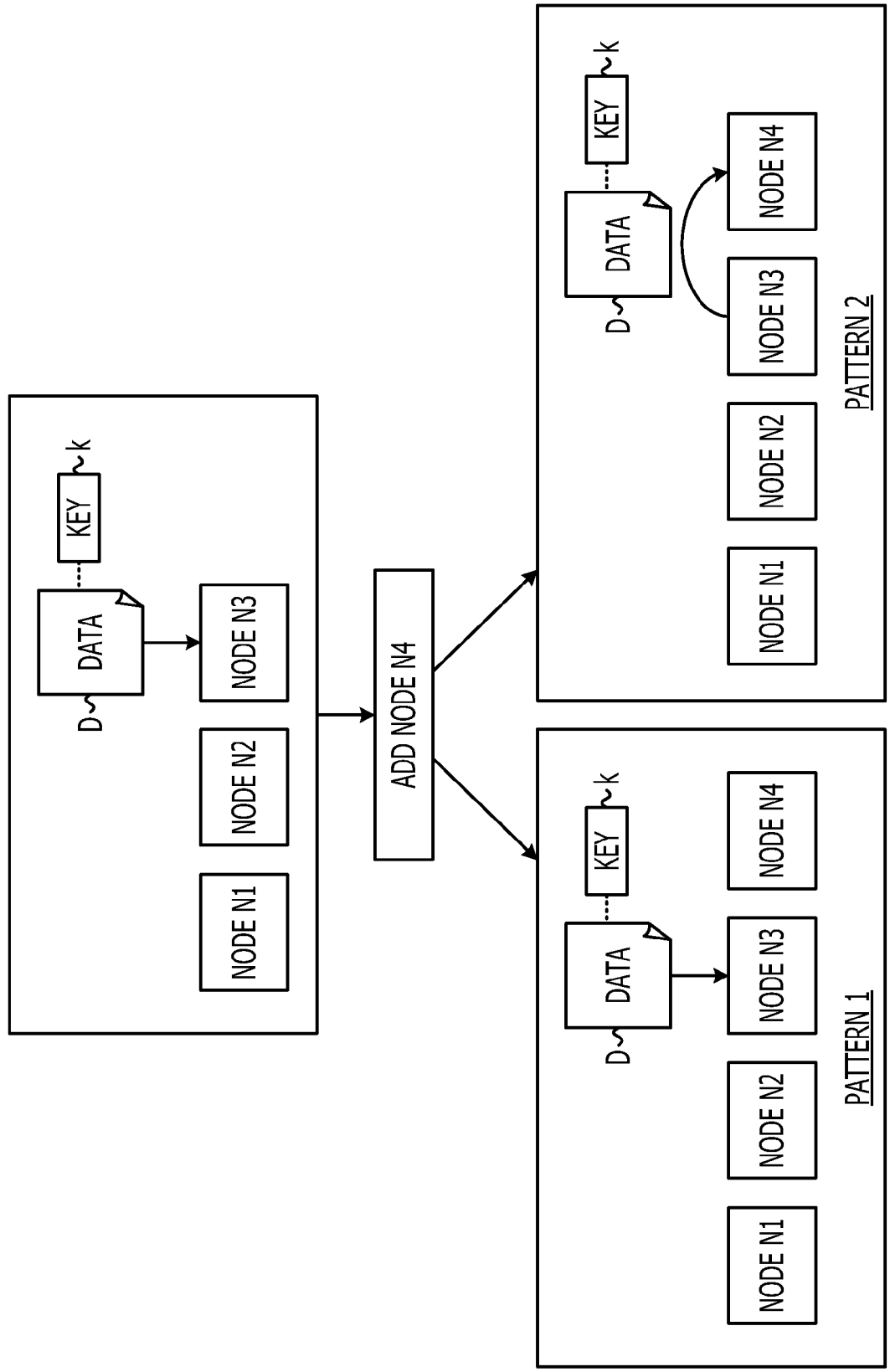
FIG. 2 illustrates an example of data movement in node addition.

FIG. 2 illustrates an example of data movement in node addition. In this example, a case where a new node N4 is added to the distributed data store after data D is stored in the node N3 is described. Here, even when the node N4 is added, the size relationship among the weighting function values $g(f\_1(k),c\_1)$, $g(f\_2(k),c\_2)$, and $g(f\_3(k),c\_3)$ of the nodes N1 to N3 does not change.

Accordingly, as a result of calculation of weighting function value $g(f\_4(k),c\_4)$ of the new node N4, the minimum weighting function value among the weighting function values $g(f\_1(k),c\_1)$ to $g(f\_4(k),c\_4)$ exhibits either the following pattern 1 or pattern 2. Pattern 1 is a case where the weighting function value $g(f\_3(k),c\_3)$ of the node N3 remains to be the minimum. Pattern 2 is a case where the weighting function value $g(f\_4(k),c\_4)$ of the node N4 becomes the minimum.

In the case of pattern 1, movement of data D does not occur. On the other hand, in the case of pattern 2, the node N4 is determined as a node for storing data D and the data D which has been stored in the node N3 moves to the node N4. That is, movement of the data D does not occur in the node addition unless the weighting function value $g(f\_4(k),c\_4)$ of the node N4 becomes the minimum, so that an occurrence of data movement among nodes can be suppressed.

Figure 3:
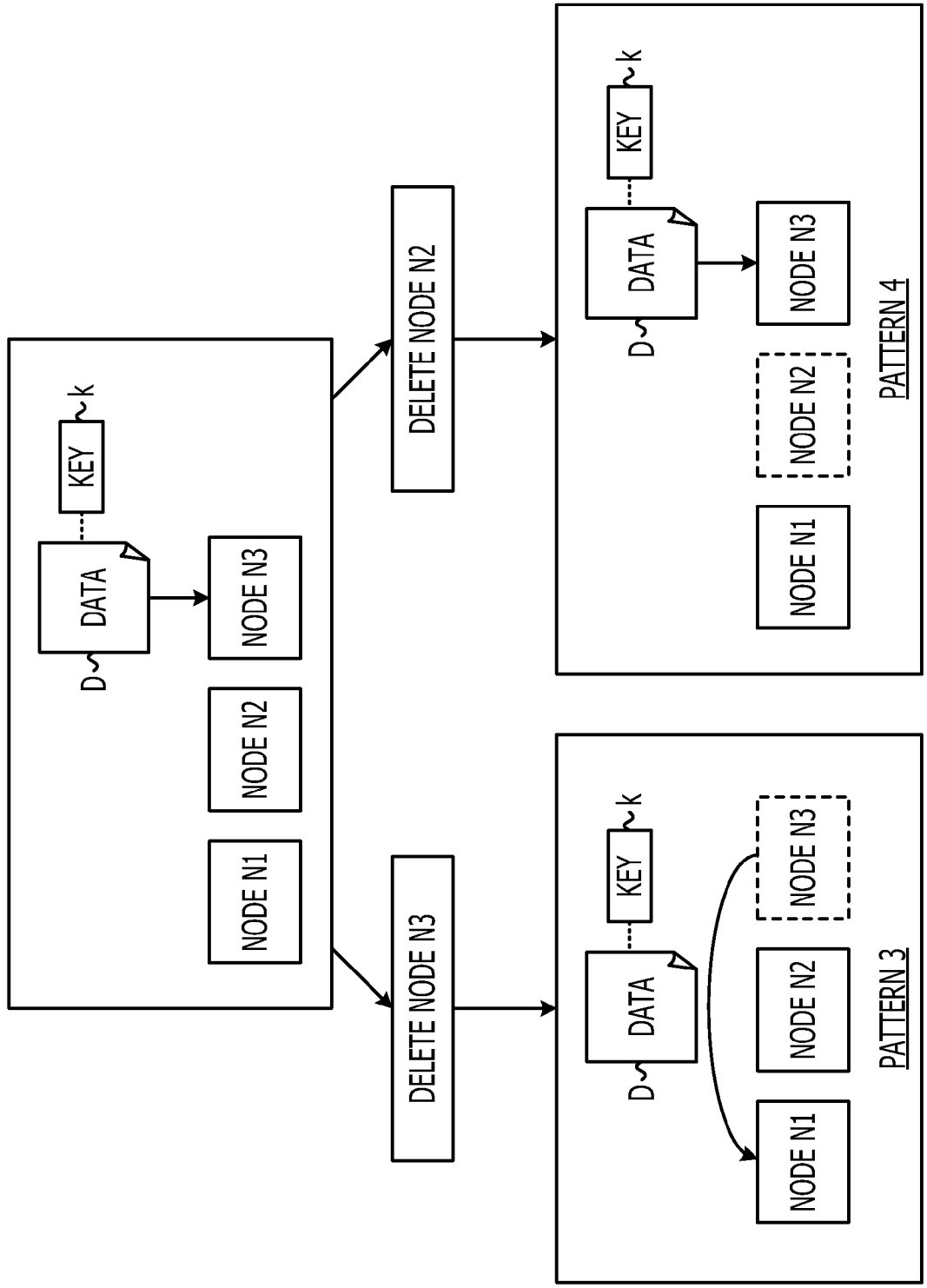
FIG. 3 illustrates an example of data movement in node deletion.

FIG. 3 illustrates an example of data movement in node deletion. In this example, a case where the node N3 in the distributed data store is deleted (pattern 3) after the data D is stored in the node N3 and a case where the node N2 is deleted after the data D is stored in the node N3 (pattern 4) are described.

In the case of pattern 3, the node N3 is deleted, so that movement of the data D which has been stored in the node N3 occurs. However, even when the node N3 is deleted, the size relationship between the weighting function values $g(f\_1(k), c\_1)$ and $g(f\_2(k), c\_2)$ of the residual nodes N1 and N2 does not change. Accordingly, the data D which has been stored in the node N3 moves to the node N1 of which the weighting function value is the second smallest from the node N3. On the other hand, in the case of pattern 4, movement of the data D does not occur. That is, movement of the date D does not occur in the node deletion unless the node N3 which stores the data D is deleted, so that an occurrence of data movement among nodes can be suppressed.

Figure 4:
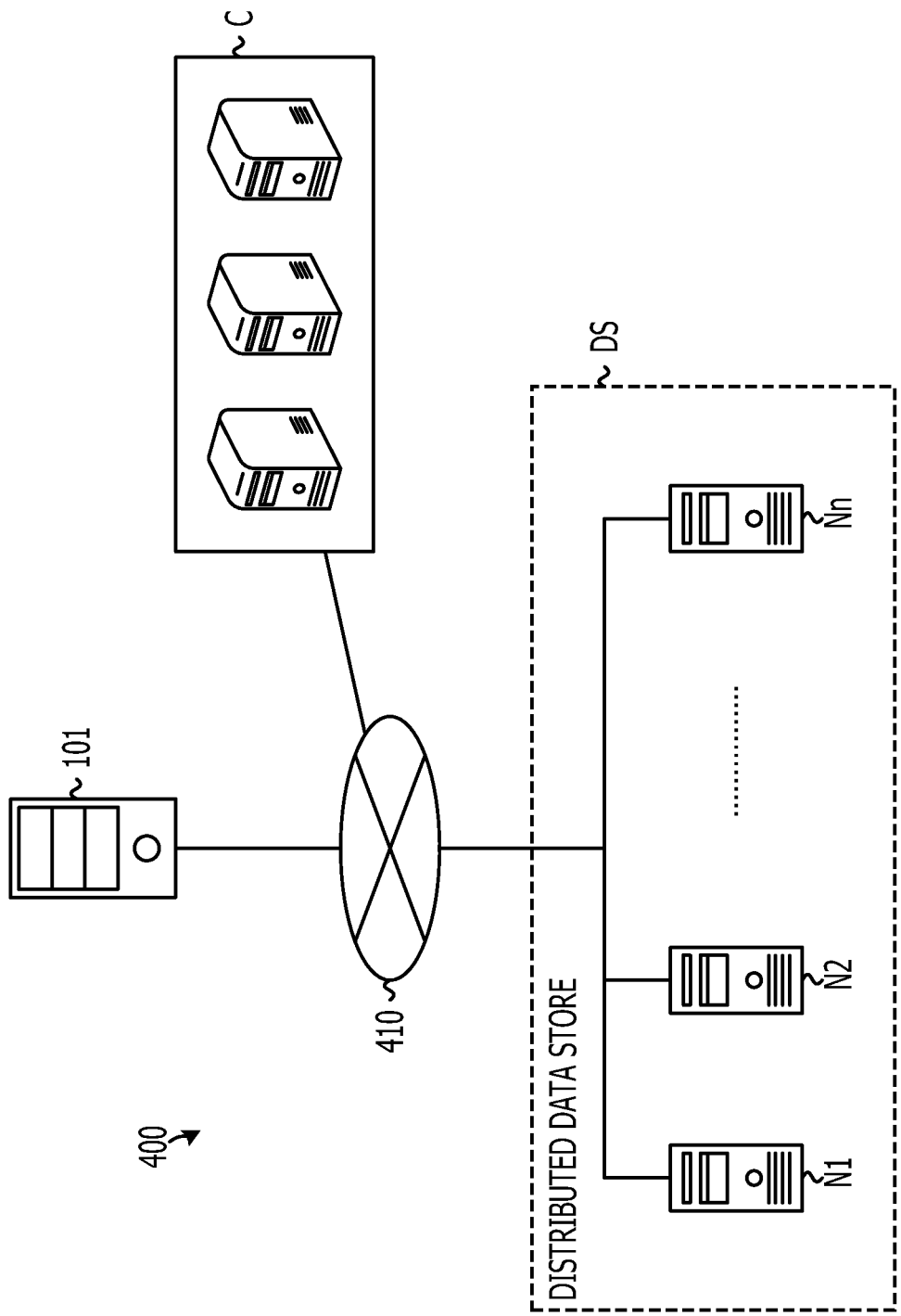
FIG. 4 illustrates an example of a distributed system according to the embodiment.

FIG. 4 illustrates an example of a distributed system according to the embodiment. As depicted in FIG. 4, a distributed system 400 includes the node determining apparatus 101, nodes N1 to Nn, and a client apparatus C. In the distributed system 400, the node determining apparatus 101, the nodes N1 to Nn, and the client apparatus C are coupled through a network 410 such as Internet, local area network (LAN), and wide area network (WAN) so as to be able to communicate with each other.

Here, the nodes N1 to Nn are servers such as a file server and a database server, for example. The client apparatus C is a computer which receives services provided from the data store, for example. The client apparatus C can refer to data D which is stored in any node in the distributed data store DS by using a key k of the data D.

In the following description, an arbitrary node among a plurality of nodes N1 to Nn is described as a "node Ni" (i=1, 2, . . . , n). Rates related to respective nodes N1 to Nn are described as "$c\_1$ to $c\_n$". A rate related to a node Ni among the rates $c\_1$ to $c\_n$ is described as "$c\_i$". A data group which is a storing object is described as "data D1 to Dm". Arbitrary data D among D1 to Dm is described as "data Dj" (j=1, 2, . . . , m). A key for uniquely specifying data Dj is described as a "key kj".

The hardware configuration of a computer (the node determining apparatus 101, the nodes N1 to Nn, the client apparatus C) used in this embodiment is now described.

Figure 5:
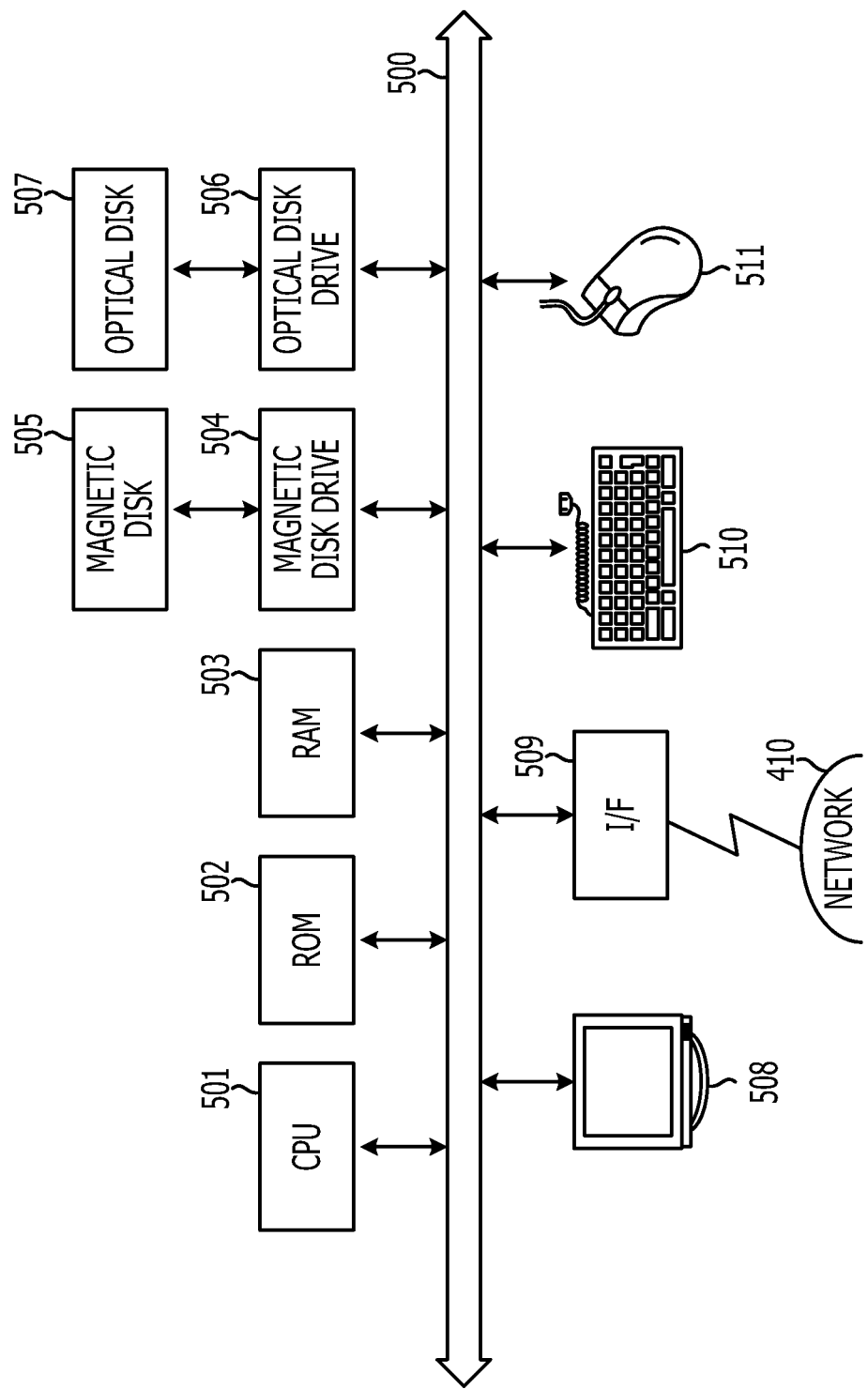
FIG. 5 is a block diagram illustrating an example of the hardware configuration of a computer which is used in the embodiment.

FIG. 5 is a block diagram illustrating an example of the hardware configuration of a computer used in this embodiment. As depicted in FIG. 5, the computer includes a central processing unit (CPU) 501, a read-only memory (ROM) 502, a random access memory (RAM) 503, a magnetic disk drive 504, a magnetic disk 505, an optical disk drive 506, an optical disk 507, a display 508, an interface (I/F) 509, a keyboard 510, and a mouse 511. Respective elements are coupled with each other by a bus 500.

The CPU 501 controls the whole of the computer. The ROM 502 stores programs such as a boot program. The RAM 503 is used as a work area of the CPU 501. The magnetic disk drive 504 controls read/write of data with respect to the magnetic disk 505 in accordance with the control of the CPU 501. The magnetic disk 505 stores data which is written in accordance with the control of the magnetic disk drive 504.

The optical disk drive 506 controls read/write of data with respect to the optical disk 507 in accordance with the control of the CPU 501. The optical disk 507 stores the data written in accordance with the control of the optical disk drive 506 and permits the computer to read data stored in the optical disk 507.

The display 508 displays a cursor, an icon, a tool box, a document, an image, or data such as function information. The display 508 is a CRT, a TFT liquid crystal display, or a plasma display, for example.

The I/F 509 is coupled to the network 410 such as LAN, WAN, and Internet through a communication line and coupled to other apparatuses via the network 410. The I/F 509 interfaces the network 410 with the inside and controls input/output of data from en external apparatus. The I/F 509 is a modem or a LAN adapter, for example.

The keyboard 510 includes keys for inputting letters, digits, and various instructions and is used for data input. The keyboard 510 may be a touch panel type input pad or numerical keypads. The mouse 511 is used for movement of a cursor, range selection, or movement or size change of a window. As long as it has the same functional capability as a pointing device, a trackball or a joystick may be employed.

Figure 6:
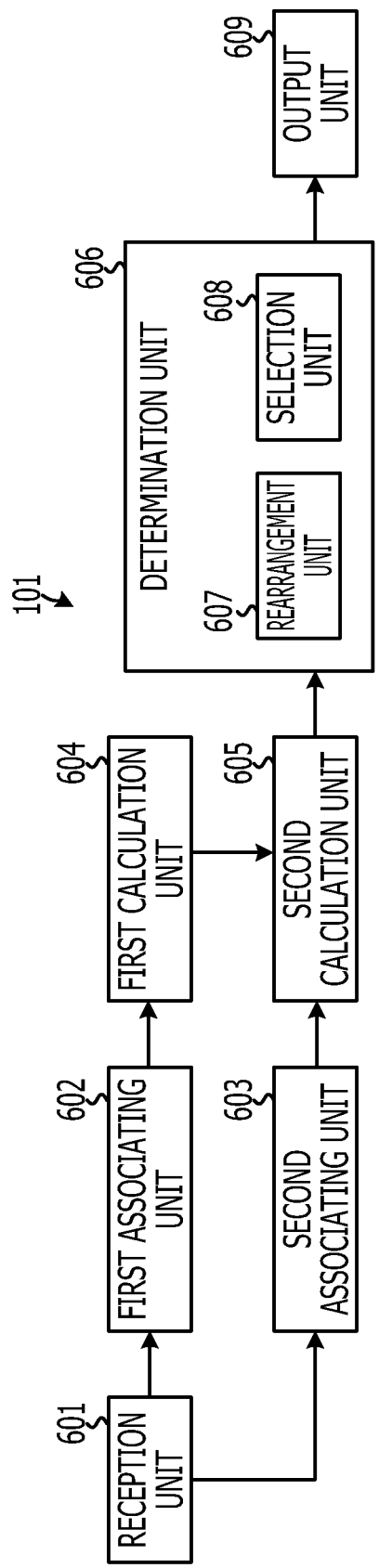
FIG. 6 is a block diagram illustrating an example of the functional configuration of the node determining apparatus according to the embodiment.

The functional configuration of the node determining apparatus 101 according to the embodiment is now described. FIG. 6 is a block diagram illustrating the functional configuration of the node determining apparatus according to the embodiment. As depicted in FIG. 6, the node determining apparatus 101 includes a reception unit 601, a first associating unit 602, a second associating unit 603, a first calculation unit 604, a second calculation unit 605, a determination unit 606, a rearrangement unit 607, a selection unit 608, and an output unit 609.

Respective function units (the reception unit 601 to the output unit 609) realize their functional capability by allowing the CPU 501 to execute a program stored in a storage device such as the ROM 502, the RAM 503, the magnetic disk 505, and the optical disk 507 which are depicted in FIG. 5 or by the I/F 509, for example. Processing results of respective function units (the reception unit 601 to the output unit 609) are stored in the storage device such as the RAM 503, the magnetic disk 505, and the optical disk 507 except for an especially specified case.

The reception unit 601 has functional capability to receive key information related to data Dj which is a storing object. Here, the key information contains a data name, a key kj, and redundancy Rj of data Dj which is the storing object, for example. Data Dj is information in folder-, file-, or record-unit, for example. A key kj is a character string of a path name of a file, a main key of a record in database, and the like, for example. Redundancy Rj is the number of nodes of a case where data Dj of an identical key kj is redundantly stored in a plurality of nodes Ni from the viewpoint of failure resistance.

Specifically, the reception unit 601 receives key information in response to operation input which is performed by a user with the keyboard 510 or the mouse 511, which is depicted in FIG. 5, for example. The reception unit 601 can receive key information from the client apparatus C via the network 410, as well. The received key information is stored in a key list 700 depicted in FIG. 7, for example.

Figure 7:
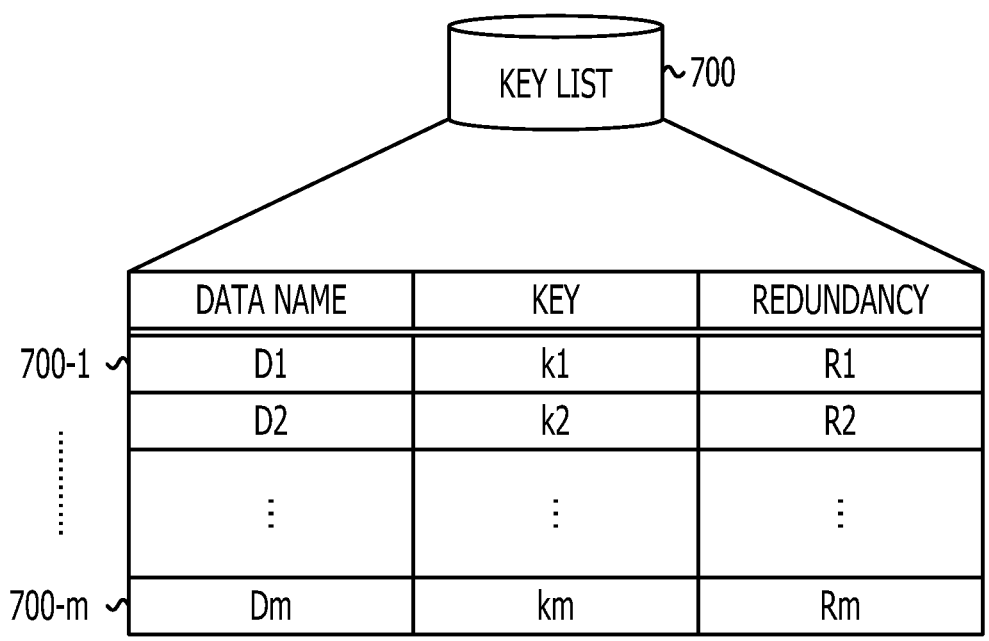
FIG. 7 illustrates an example of stored contents of a key list.

FIG. 7 illustrates an example of stored contents of a key list. As depicted in FIG. 7, a key list 700 has fields of a data name, a key, and redundancy, and stores key information 700-1 to 700-$m$ as records by setting information in respective fields. Here, the data name is a name of data Dj. The key is information for uniquely specifying data Dj. The redundancy is the number of nodes of a case where data Dj is redundantly stored in a plurality of nodes Ni.

The stored contents of the key list 700 are updated whenever key information is received or data Dj is deleted from the distributed data store DS, for example. The functional capability of the key list 700 is realized by a storage device such as the ROM 502, the RAM 503, the magnetic disk 505, and the optical disk 507, for example.

Referring back to the description of FIG. 6, the reception unit 601 has a function to receive an index value associated with a node Ni. Here, the index value is a value indicating how much data D is stored in a node Ni among data D1 to data Dm which are distributed to be stored in the nodes N1 to Nn. In particular, an index value is the above-described rate $c\_i$ and is determined based on storage capacity, computing power, and line speed of a node Ni, for example.

Specifically, the reception unit 601 receives a rate $c\_i$ associated with a node Ni in response to an operation input which is performed by a user with the keyboard 510 or the mouse 511, for example. The reception unit 601 can receive a rate $c\_i$ associated with a node Ni from a node Ni or the client apparatus C via the network 410, as well. The received index value associated with the node Ni is stored in an index value list 900 depicted in FIG. 9 by the second associating unit 603 described later, for example.

The reception unit 601 has functional capability to receive a node determination instruction associated with increase/decrease of the number of nodes in the distributed data store DS. Here, the node determination instruction is used for instructing redetermination of a node Ni, which is to be a storage location of data Dj, in accordance with increase/decrease of the number of nodes.

Specifically, in a node determination instruction associated with node addition, a node name of a node Ni which is newly added to the distributed data store DS is included, for example. In the node determination instruction associated with the node addition, a rate $c\_i$ related to the added node Ni is included, for example. The index value related to the node Ni included in the received node determination instruction is stored in the index value list 900 depicted in FIG. 9 by the second associating unit 603 described later, for example. A node Ni is newly added so as to improve performance of the distributed system 400, for example.

In a node determination instruction associated with node deletion, a node name of a node Ni which is deleted from the distributed data store DS is included, for example. A node Ni is deleted in a failure of the node Ni, for example.

In particular, the reception unit 601 receives a node determination instruction in response to operation input which is performed by a user with the keyboard 510 or the mouse 511, for example. The reception unit 601 can receive the node determination instruction from a node Ni or the client apparatus C via the network 410, as well.

The first associating unit 602 has functional capability to associate a function with each node Ni. Hereinafter, a function of a node Ni is described as "function $f\_i(\ )$". Here, the function $f\_i(\ )$ is a function which differs according to a node Ni and of which a domain includes a key kj of data Dj. That is, the function $f\_i(\ )$ is a function of which the domain includes a range of values that the key kj can take.

Concretely, the first associating unit 602 selects an arbitrary function as the function $f\_i(\ )$ from the function group F which is prepared, so as to associate the function $f\_i(\ )$ with a node Ni, for example. An associating result is stored in a function list 800 depicted in FIG. 8, for example. The function group F is a set of functions of nodes in the number of at least n, and is stored in a storage device such as the ROM 502, the RAM 503, the magnetic disk 505, and the optical disk 507.

The first associating unit 602 can prepare one function $f(\ )$ taking two arguments so as to define the function $f\_i(\ )$ as the following formula (1), for example. Here, i denotes a node name of a node Ni and kj denotes a key of data Dj. The function $f(\ )$ taking two arguments is stored in the storage device such as the ROM 502, the RAM 503, the magnetic disk 505, and the optical disk 507, for example.

$$f\_i(\ )=f(i,kj) \tag{1}$$

As the function $f\_i(\ )$, an arbitrary function can be used as long as the function satisfies a condition of the above-described domain. Specifically, a function by which a fixed length random number can be obtained by inputting a key kj as an argument, for example, may be used as the function $f\_i(\ )$. More specifically, a hash function such as secure hash algorithm 1 (SHA1) may be used as the function $f\_i(\ )$, for example. SHA1 is a function having such property that when an input varies a little, an output varies largely. For example, when both of a key kj and a node name "i" are integers, a function "$f\_i(\ )$ kj+i" in which the node name "i" is added to the key kj may be used.

Further, as functions $f\_1(\ )$ to $f\_n(\ )$ of nodes N1 to Nn, functions of which frequency distribution of function values are sufficiently equal to each other and which are independent from each other may be used. Specifically, the first associating unit 602 may define the function $f\_i(\ )$ as the following formula (2) by using a hash function such as SHA1, for example. Here, concatnate(i,kj) is a function which couples the node name "i" of a node Ni and the key kj of data Dj as a character string.

$$f\_i(\ )=SHA1(concatnate(i,kj)) \tag{2}$$

Figure 8:
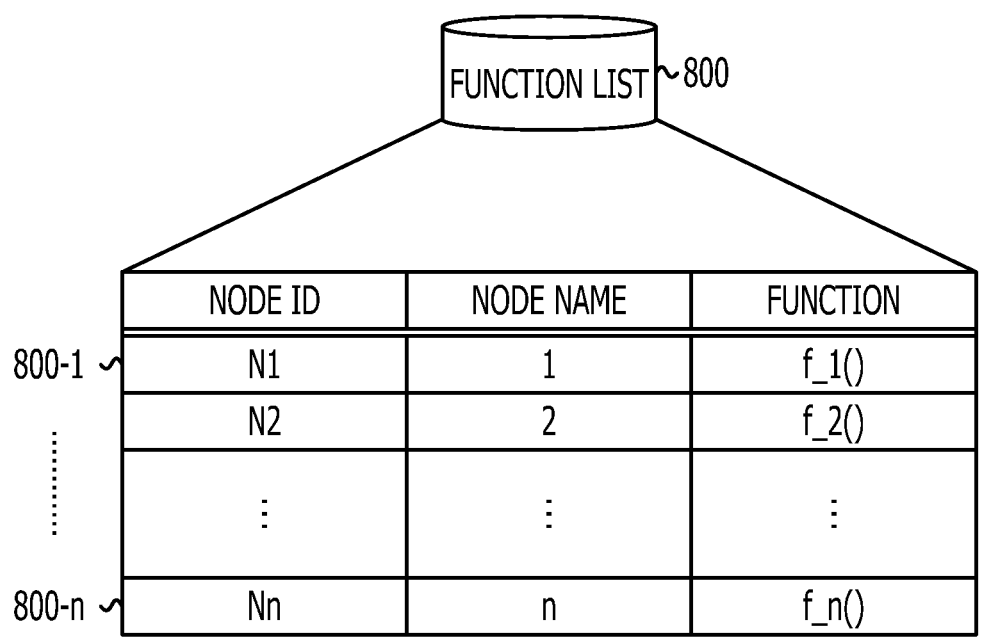
FIG. 8 illustrates an example of stored contents of a function list.

FIG. 8 illustrates an example of stored contents of a function list. As depicted in FIG. 8, the function list 800 has fields of a node ID, a node name, and a function, and stores function information 800-1 to 800-$n$ as records by setting information in respective fields.

The node ID is an identifier of a node Ni which is used in the description of this specification. The node name is a name of a node Ni. The function is a function $f\_i(\ )$ associated with a node Ni. The functional capability of the function list 800 is realized by a storage device such as the ROM 502, the RAM 503, the magnetic disk 505, and the optical disk 507, for example.

Referring back to the description of FIG. 6, the second associating unit 603 has functional capability to associate an index value, which indicates an amount of data to be stored, for every node Ni with each node Ni. Specifically, the second associating unit 603 associates a rate $c\_i$ related to a node Ni which is received by the reception unit 601 with a node Ni, for example. An associating result is stored in the index value list 900 depicted in FIG. 9, for example.

Figure 9:
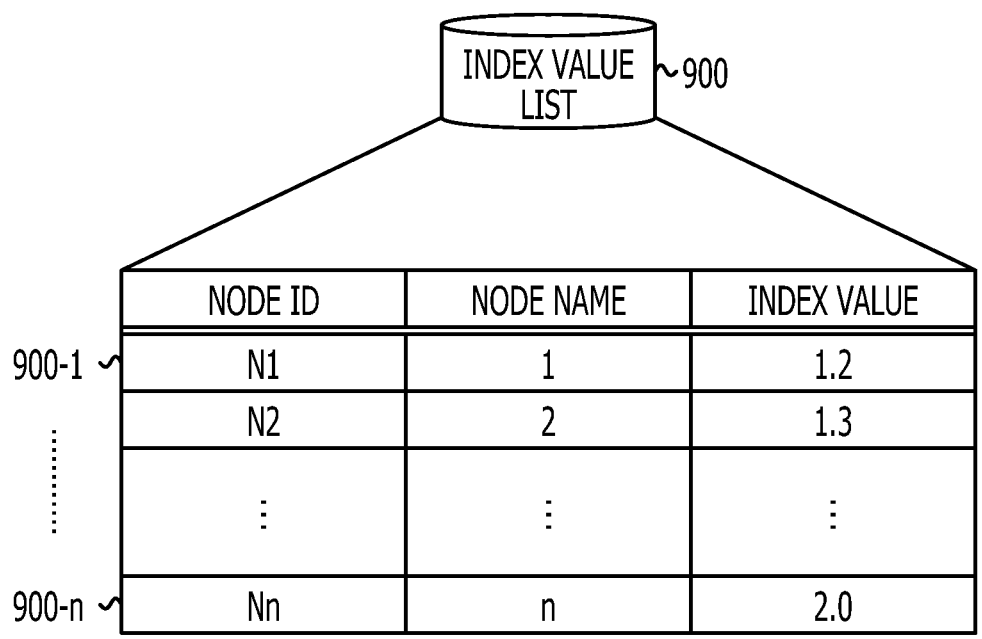
FIG. 9 illustrates an example of stored contents of an index value list.

FIG. 9 illustrates an example of stored contents of an index value list. As depicted in FIG. 9, the index value list 900 has fields of a node ID, a node name, and an index value, and stores index value information 900-1 to 900-$n$ as records by setting information in respective fields. The index value is a rate $c\_i$ associated with a node Ni. The functional capability of the index value list 900 is realized by a storage device such as the ROM 502, the RAM 503, the magnetic disk 505, and the optical disk 507, for example.

Referring back to the description of FIG. 6, the first calculation unit 604 has functional capability to respectively substitute keys k in associated functions $f\_i(\ )$ of respective nodes Ni so as to calculate values (hereinafter, "function values $f\_i(k)$") of a function $f\_i(\ )$ of each node Ni. Specifically, the first calculation unit 604 inputs a key k as an argument into a function $f\_i(\ )$ so as to calculate a function value $f\_i(k)$ of each node Ni, for example.

When the above-mentioned formula (1) is used as the function $f\_i(\ )$, the first calculation unit 604 inputs a node name "i" of a node Ni and a key k as arguments into the above-mentioned formula (1) so as to calculate a function value $f\_i(k)$ of each node Ni. An obtained calculation result is stored in a function value list 1000 depicted in FIG. 10, for example.

Figure 10:
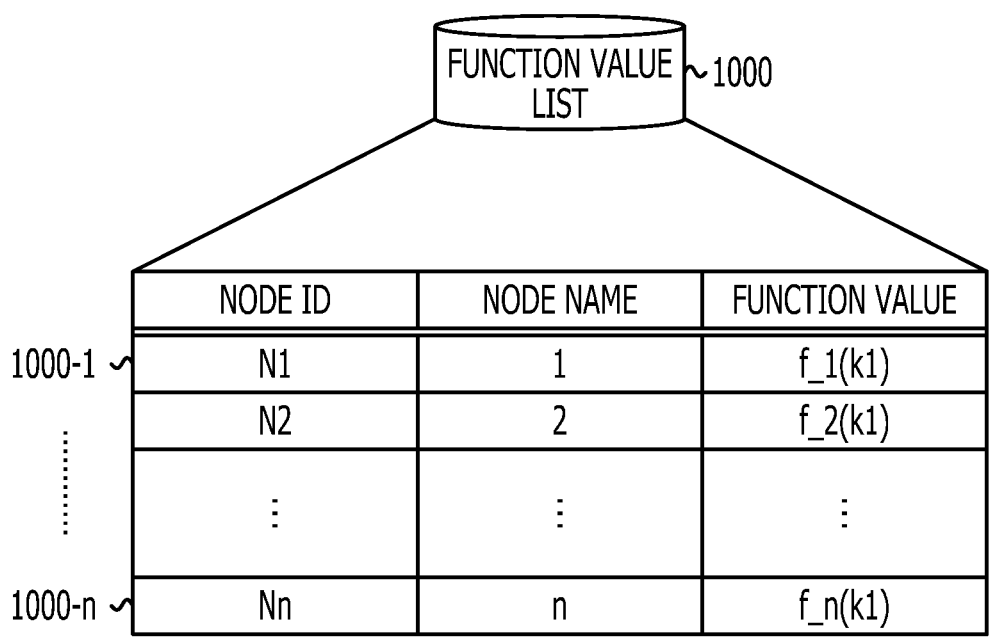
FIG. 10 illustrates an example of stored contents of a function value list.

FIG. 10 illustrates an example of stored contents of a function value list. As depicted in FIG. 10, the function value list 1000 has fields of a node ID, a node name, and a function value, and stores function value information 1000-1 to 1000-$n$ as records by setting information in respective fields. The functional capability of the function value list 1000 is realized by a storage device such as the ROM 502, the RAM 503, the magnetic disk 505, and the optical disk 507, for example.

Referring back to the description of FIG. 6, the second calculation unit 605 has functional capability to substitute a function value $f\_i(k)$ of each node Ni and an index value of each node Ni in a weighting function $g(\ )$ so as to calculate a value (hereinafter, "weighting function value $g(f\_i(k),c\_i)$") of a weighting function $g(\ )$ for every node Ni.

Here, a weighting function $g(\ )$ is a function of which a domain includes a combination of a function value $f\_i(k)$ of each node Ni and an index value of each node Ni and the size relationship of weighting function values $g(f\_i(k),c\_i)$ is defined within the range. That is, the weighting function $g(\ )$ is a function of which a domain includes a range of a combination of a value which can be taken by a function value $f\_i(k)$ of each node Ni and a value which can be taken by an index value of each node Ni and the size relationship of weighting function values $g(f\_i(k),c\_i)$ can be compared within the range.

The weighting function $g(\ )$ is a function of which a weighting function value $g(f\_i(k),c\_i)$ is increased or a function of which a weighting function value $g(f\_i(k),c\_i)$ is decreased in accordance with increase of a function value $f\_i(k)$ which is an argument. The weighting function $g(\ )$ is a function of which a weighting function value $g(f\_i(k),c\_i)$ is increased or a function of which a weighting function value $g(f\_i(k),c\_i)$ is decreased in accordance with increase of an index value which is an argument. The weighting function $g(\ )$ is stored in a storage device such as the ROM 502, the RAM 503, the magnetic disk 505, and the optical disk 507, for example.

As the weighting function $g(\ )$, an arbitrary function may be used as long as the function satisfies the above-described condition. Specifically, a function which is expressed as "$g(f\_i(k),c\_i)=f\_i(k)/c\_i$" may be used as the weighting function $g(\ )$, for example. Accordingly, a weighting function value $g(f\_i(k),c\_i)$ can be calculated while reflecting an index value $c\_i$ of each node Ni.

As the weighting function $g(\ )$, such function can be used that a weighting function value $g(f\_i(k),c\_i)$ of any node Ni becomes the maximum or the minimum at a rate of an index value $c\_i$ of any node Ni with respect to a sum of index values $c\_i$ of respective nodes Ni, in a size relationship of values, which is defined within a range of the weighting function, of the weighting function.

Specifically, as the weighting function $g(\ )$, a function which is expressed as "$g(f\_i(k),c\_i)=f\_i(k)^{\char`\^}c\_i$" may be used, for example. Here, "$f\_i(k)^{\char`\^}c\_i$" expresses a formula in which $f\_i(k)$ is exponentiated by $c\_i$. Accordingly, the weighting function value $g(f\_i(k),c\_i)$ can be calculated while reflecting an index value $c\_i$ of each node Ni.

Concretely, the second calculation unit 605 substitutes a function value $f\_i(k)$ of each node Ni and a rate $c\_i$ of each node Ni in the weighting function $g(\ )$ so as to calculate a weighting function value $g(f\_i(k),c\_i)$ for every node Ni. An obtained calculation result is stored in a weighting function value list 1100 depicted in FIG. 11, for example.

Figure 11:
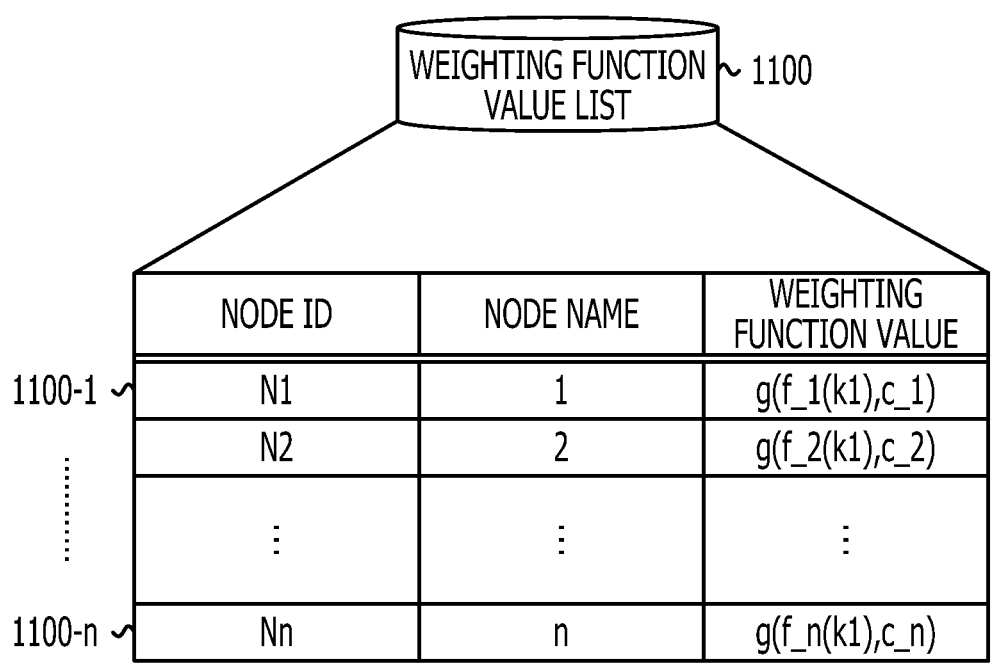
FIG. 11 illustrates an example of stored contents of a weighting function value list.

FIG. 11 illustrates an example of stored contents of a weighting function value list. As depicted in FIG. 11, the weighting function value list 1100 has fields of a node ID, a node name, and a weighting function value. Further, the weighting function value list 1100 stores weighting function value information 1100-1 to 1100-$n$ as records by setting information in respective fields. The functional capability of the weighting function value list 1100 is realized by a storage device such as the ROM 502, the RAM 503, the magnetic disk 505, and the optical disk 507, for example.

Referring back to the description of FIG. 6, the determination unit 606 has functional capability to determine a node Ni in which data Dj is to be stored, based on a size relationship of calculated weighting function values $g(f\_i(k),c\_i)$ of respective nodes Ni. Specifically, the determination unit 606 determines a node Ni corresponding to the minimum (or maximum) weighting function value $g(f\_i(k),c\_i)$ among weighting function values $g(f\_1(k),c\_1)$ to $g(f\_n(k),c\_n)$, as a node Ni in which data Dj is to be stored, for example.

The rearrangement unit 607 has functional capability to rearrange the weighting function values $g(f\_i(k),c\_i)$ of respective nodes Ni based on the size relationship of the calculated weighting function values $g(f\_i(k),c\_i)$ of respective nodes Ni. Concretely, the rearrangement unit 607 rearranges weighting function values $g(f\_1(k),c\_1)$ to $g(f\_n(k),c\_n)$ of nodes N1 to Nn in ascending (or descending) order, for example.

The selection unit 608 has functional capability to select a predetermined number of nodes Ni from the nodes N1 to Nn in accordance with the order of the rearranged weighting function values $g(f\_i(k),c\_i)$ of respective nodes Ni. Here, the predetermined number is redundancy Rj of data Dj, for example. In the following description, rearranged weighting function values $g(f\_1(k),c\_1)$ to $g(f\_n(k),c\_n)$ of the nodes N1 to Nn are described as "function values g[1] to g[n]".

Specifically, the selection unit 608 first selects Rj pieces of function values g[1] to g[Rj] from the head (or the end) of the rearranged function values g[1] to g[n], for example. Then, the selection unit 608 refers to the weighting function value list 1100 so as to specify and select Rj pieces of nodes Ni corresponding to the selected function values g[1] to g[Rj].

In the following description, Rj pieces of selected nodes Ni are described as "nodes N[1] to N[Rj]". In a case where the redundancy Rj satisfies "Rj=1", the selection unit 608 may select nodes Ni from the head (or the end) to the specified order of the rearranged function values g[1] to g[n].

The determination unit 606 may determine predetermined number of selected nodes Ni as nodes Ni in which data Dj is to be stored. Specifically, the determination unit 606 determines Rj pieces of selected nodes N[1] to N[Rj] as nodes Ni in which data Dj is to be stored, for example. The determination result is stored in a node/key correspondence list 1200 depicted in FIG. 12.

Figure 12:
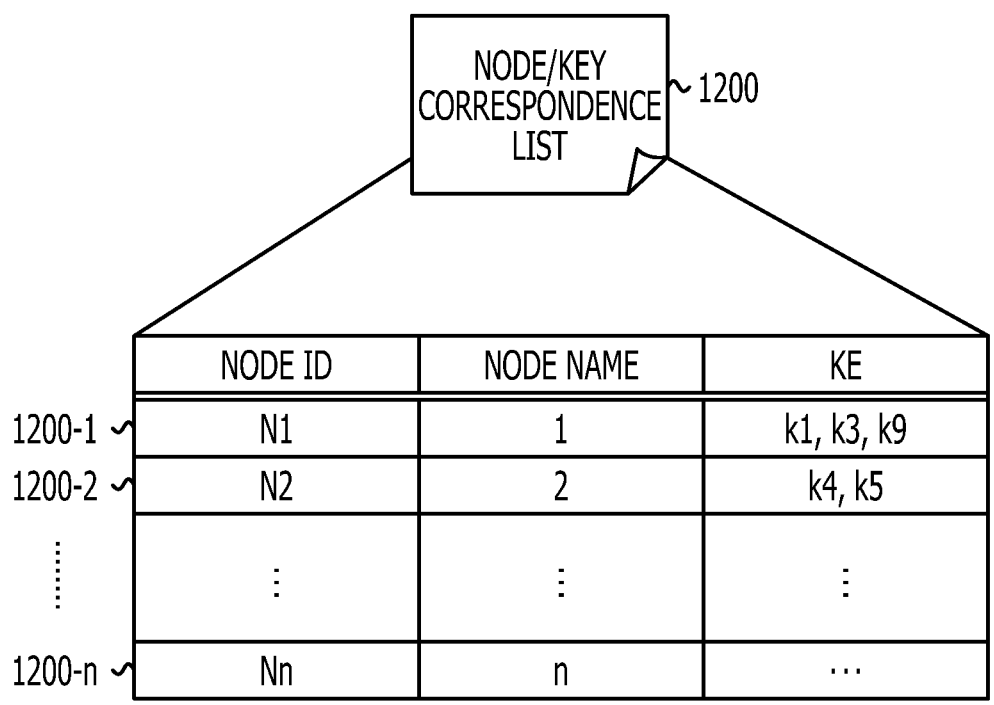
FIG. 12 illustrates an example of stored contents of a node/key correspondence list.

FIG. 12 illustrates an example of stored contents of a node/key correspondence list. As depicted in FIG. 12, the node/key correspondence list 1200 has fields of a node ID, a node name, and a key. By setting information in respective fields, correspondence information 1200-1 to 1200-$n$ of respective nodes N1 to Nn is stored as records.

As an example, in a case where a node N1 is determined as a node Ni in which data D1, data D3, and data D9 are to be stored, keys k1, k3, and k9 of the respective data D1, D3, and D9 are set in the "key" field of correspondence information 1200-1. In a case where a node N2 is determined as a node Ni in which data D4 and data D5 are to be stored, keys k4 and k5 of the respective data D4 and D5 are set in the "key" field of correspondence information 1200-2. A key kj of each data Dj can be specified by referring to the key list 700, for example.

Referring back to the description of FIG. 6, the output unit 609 has functional capability to output a determination result. Specifically, the output unit 609 outputs the node/key correspondence list 1200 depicted in FIG. 12, for example. Examples of the outputting method include display on the display 508, printing output to a printer (not depicted), and transmission by the I/F 509 to an external device. The output unit 609 can store the determination result in a storage region such as the RAM 503, the magnetic disk 505, and the optical disk 507 instead of outputting the determination result.

More specifically, the output unit 609 can transmit the node/key correspondence list 1200 to an external computer which controls data movement among nodes, for example. In this case, the external computer controls data movement among nodes in accordance with the node/key correspondence list 1200, for example. The output unit 609 can transmit a movement instruction of data Di to a node Ni in accordance with the node/key correspondence list 1200, as well.

The case where the node determining apparatus 101 and a node Ni are separately provided is described in the abovementioned description, but the configuration is not limited to this case. Concretely, such configuration that a node Ni includes the node determining apparatus 101 may be employed, for example.

A node determination processing procedure of the node determining apparatus 101 according to the embodiment is now described. A case where a node Ni which is to be a storage location of data D1 to Dm is determined among node N1 to Nn is described as an example. In this example, it is assumed that the reception unit 601 has generated the key list 700 and the second associating unit 603 has generated the index value list 900.

Figure 13:
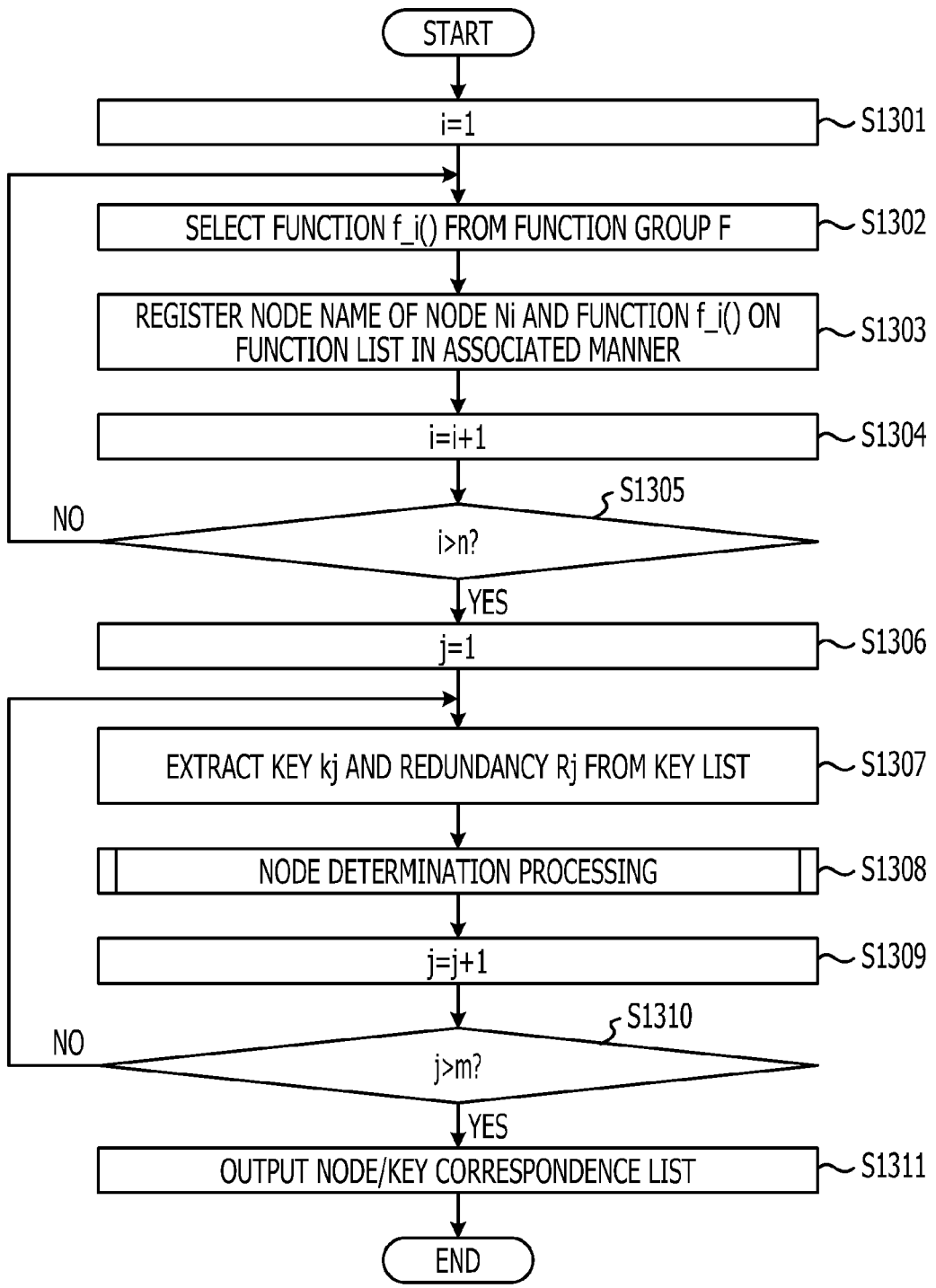
FIG. 13 is a flowchart illustrating an example of a node determination processing procedure of the node determining apparatus according to the embodiment.

FIG. 13 is a flowchart illustrating an example of a node determination processing procedure of the node determining apparatus according to the embodiment. As depicted in the flowchart of FIG. 13, the first associating unit 602 first initializes "i" of a node Ni as "i=1" (S1301) and selects a function f_i( ) from a function group F (S1302). Then, the first associating unit 602 registers a node name of the node Ni and the selected function f_i( ) on the function list 800 in a manner to associate the node name with the function f_i( ) (S1303).

Subsequently, the first associating unit 602 increments "i" of the node Ni (S1304) and determines whether "i" is larger than "n" or not (S1305). When "i" is equal to or smaller than "n" (S1305: No), the procedure returns to S1302.

On the other hand, when "i" is larger than "n" (S1305: Yes), the first calculation unit 604 initializes "j" of data Dj as "j=1" (S1306). Then, the first calculation unit 604 extracts a key kj of the data Dj and redundancy Rj from the key list 700 (S1307).

Subsequently, the determination unit 606 executes node determination processing to determine a node Ni in which the data Dj is to be stored (S1308). Then, the first calculation unit 604 increments "j" of the data Dj (S1309) and determines whether "j" is larger than "m" or not (S1310). When "j" is equal to or smaller than "m" (S1310: No), the procedure returns to S1307.

On the other hand, when "j" is larger than "m" (S1310: Yes), the output unit 609 outputs the node/key correspondence list 1200 (S1311) and a series of processing according to this flowchart is ended.

Figure 14:
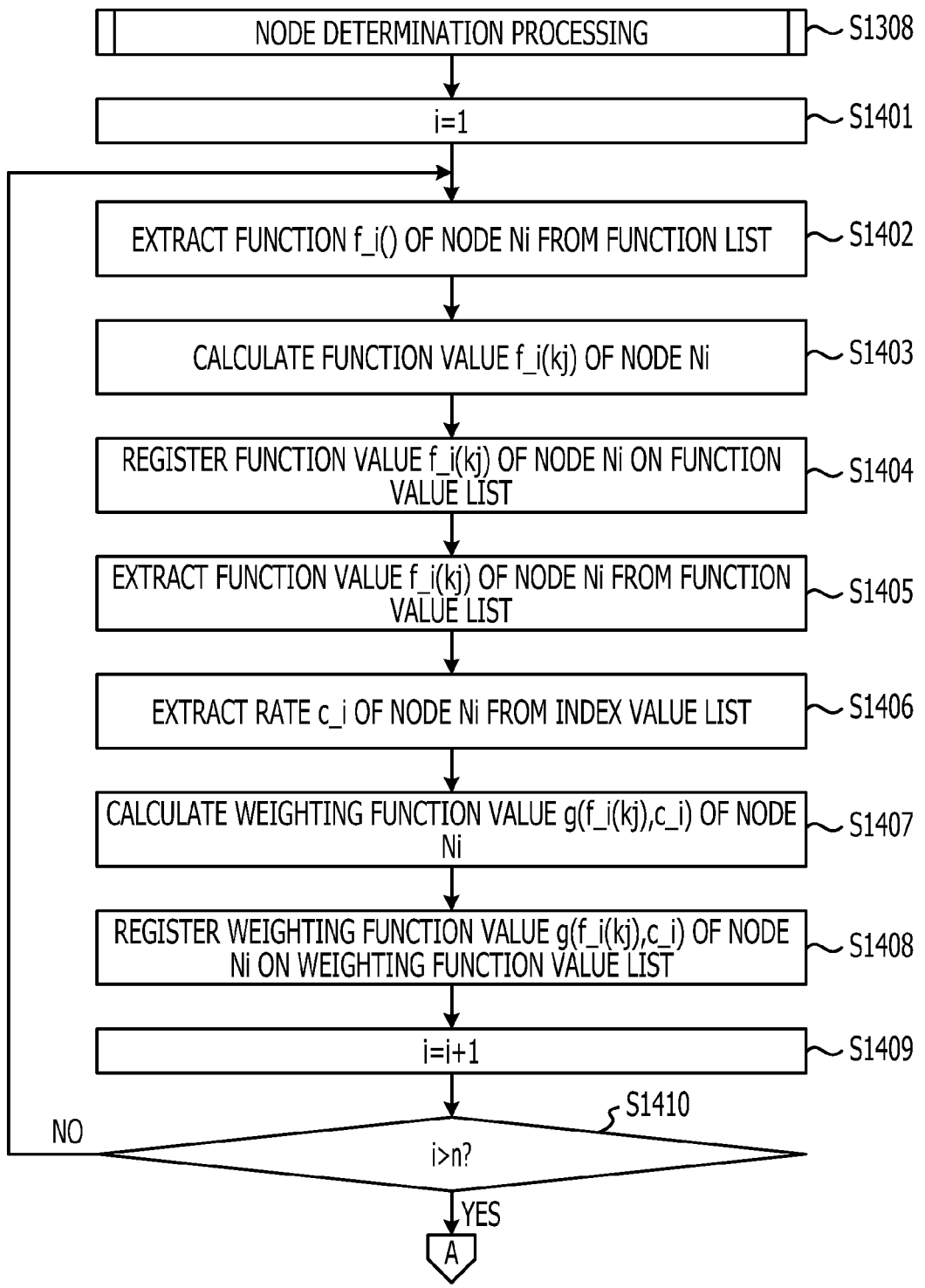
FIG. 14 is a flowchart (I) illustrating an example of a specific processing procedure of the node determination processing of S1308.
Figure 15:
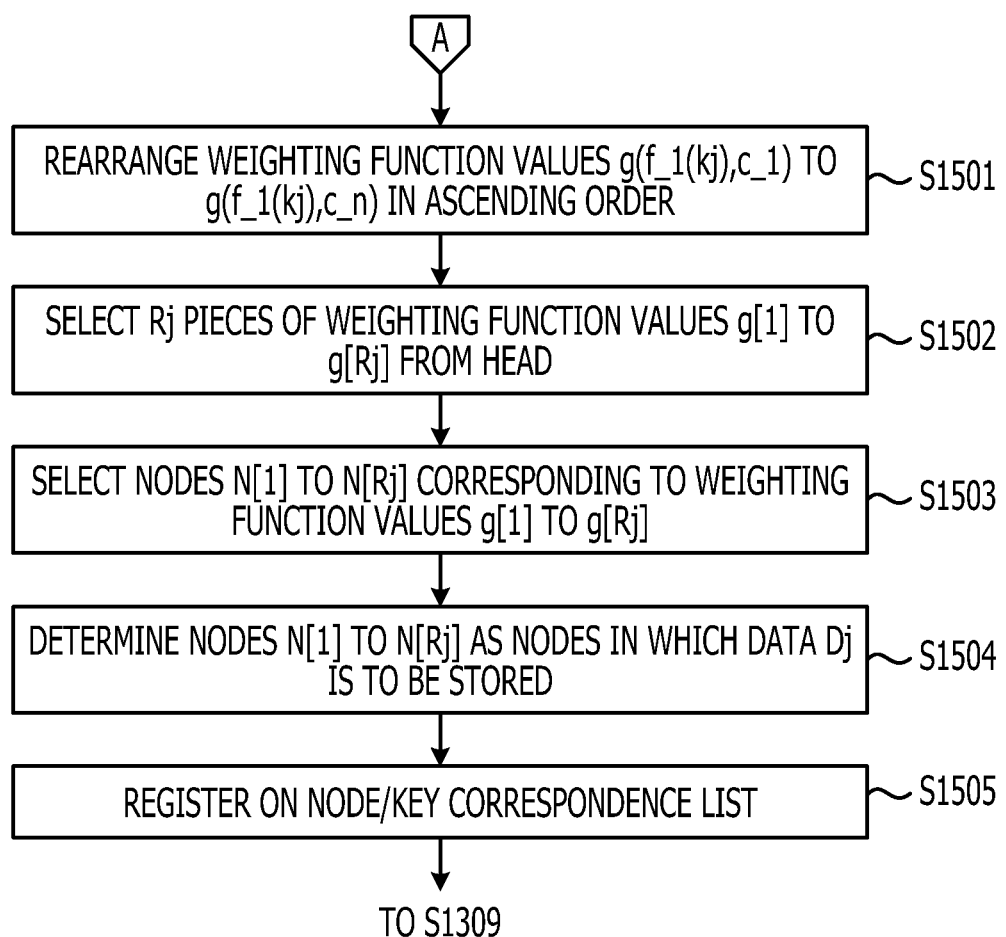
FIG. 15 is a flowchart (II) illustrating an example of a specific processing procedure of the node determination processing of S1308.

A specific processing procedure of the node determination processing of S1308 depicted in FIG. 13 is now described. FIGS. 14 and 15 are flowcharts illustrating an example of a specific processing procedure of the node determination processing of S1308.

As depicted in the flowchart of FIG. 14, the first calculation unit 604 first initializes "i" of a node Ni as "i=1" (S1401) and extracts a function f_i( ) of the node Ni from the function list 800 (S1402).

Subsequently, the first calculation unit 604 substitutes a key kj, which is extracted in S1307 depicted in FIG. 13, in the extracted function f_i( ) so as to calculate a function value f_i(kj) of the node Ni (S1403). Then, the first calculation unit 604 registers the calculated function value f_i(kj) of the node Ni on the function value list 1000 (S1404).

Subsequently, the second calculation unit 605 extracts a function value f_i(kj) of a node Ni from the function value list 1000 (S1405). Then, the second calculation unit 605 extracts a rate c_i related to the node Ni from the index value list 900 (S1406).

Subsequently, the second calculation unit 605 substitutes the extracted function value f_i(kj) of the node Ni and the rate c_i in the weighting function g( ) so as to calculate a weighting function value g(f_i(kj),c_i) of the node Ni (S1407). Then, the second calculation unit 605 registers the calculated weighting function value g(f_i(kj),c_i) of the node Ni on the weighting function value list 1100 (S1408).

Subsequently, the second calculation unit 604 increments "i" of the node Ni (S1409) and determines whether "i" is larger than "n" or not (S1410). When "i" is equal to or smaller than "n" (S1410: No), the procedure returns to S1402.

On the other hand, when "i" is larger than "n" (S1410: Yes), the procedure goes to S1501 depicted in FIG. 15. As depicted in the flowchart of FIG. 15, the rearrangement unit 607 refers to the weighting function value list 1100 so as to rearrange weighting function values g(f_1(kj),c_1) to g(f_n(kj),c_n) in ascending order (S1501).

Subsequently, the selection unit 608 selects Rj pieces of weighting function values g[1] to g[Rj] from the head of the rearranged weighting function values g[1] to g[n] (S1502). Here, Rj denotes the redundancy Rj extracted in S1307 depicted in FIG. 13. Then, the selection unit 608 refers to the weighting function value list 1100 so as to select nodes N[1] to N[Rj] corresponding to the Rj pieces of selected weighting function values g[1] to g[Rj] (S1503).

Subsequently, the determination unit 606 determines the selected nodes N[1] to N[Rj] as nodes Ni in which the data Dj is to be stored (S1504). Then, the determination unit 606 registers the determination result on the node/key correspondence list 1200 (S1505) and the procedure goes to S1309 depicted in FIG. 13.

Accordingly, nodes Ni in which data Dj is to be stored can be determined from a size relationship of weighting function values g(f_i(kj),c_i) which are obtained by inputting a function value f_i(kj) of each node Ni and a rate c_i of each node Ni into a weighting function g ( ) as arguments. As a result, data Dj can be stored in a distributed manner in respective nodes Ni in the distributed data store DS in accordance with an index value c_i which is set for every node Ni. Further, data movement among nodes can be reduced in increase/decrease of the number of nodes in the distributed data store DS.

Figure 16:
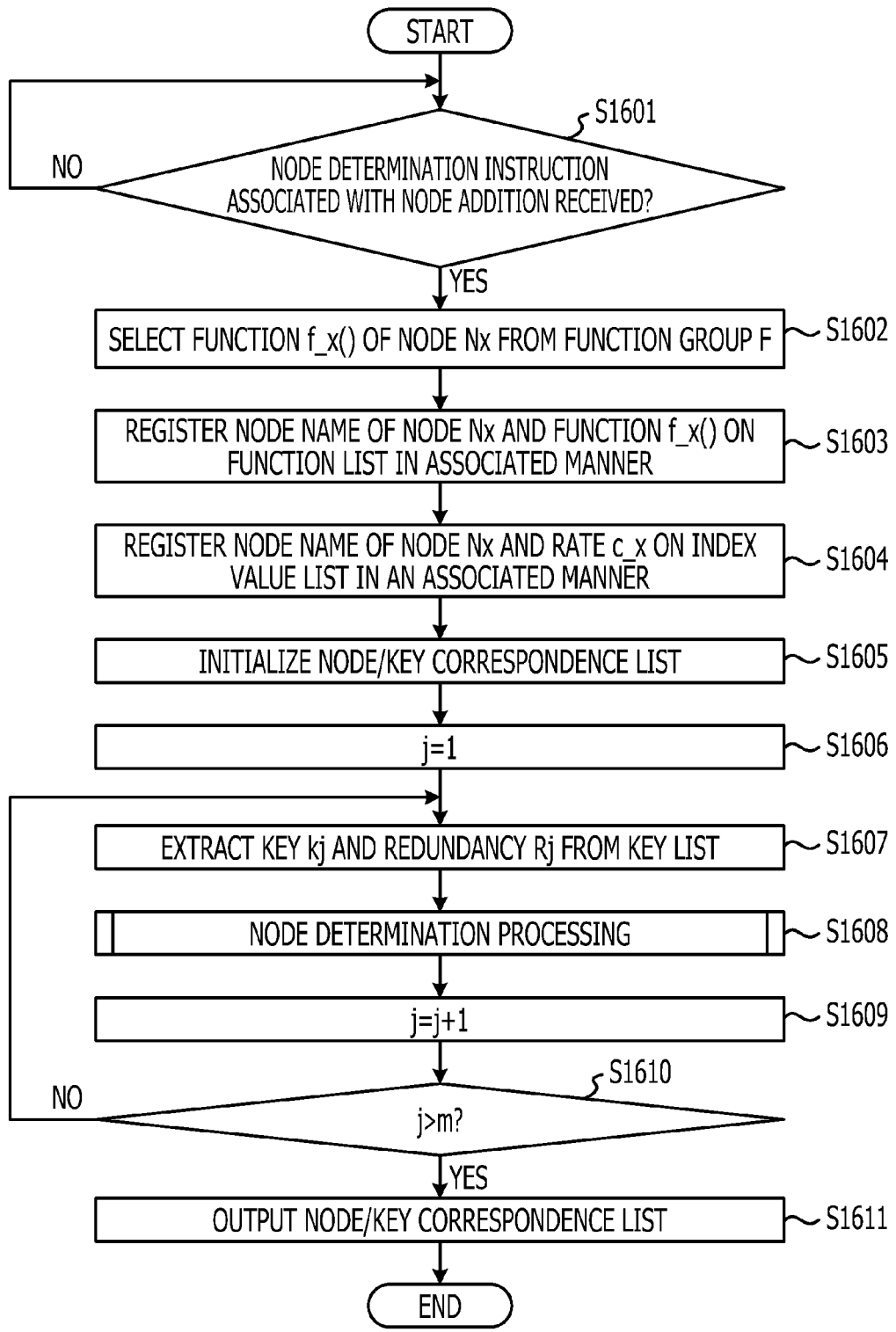
FIG. 16 is a flowchart illustrating an example of the node determination processing procedure of the node determining apparatus in node addition.

A node determination processing procedure of the node determining apparatus 101 in node addition is now described. In this example, a node Ni which is newly added to the distributed data store DS is described as a "node Nx". FIG. 16 is a flowchart illustrating an example of a node determination processing procedure of the node determining apparatus in node addition.

As depicted in the flowchart of FIG. 16, the reception unit 601 first determines whether to receive a node determination instruction associated with node addition or not (S1601). Here, the reception unit 601 waits to receive a node determination instruction (S1601: No). When the reception unit 601 receives a node determination instruction (S1601: Yes), the first associating unit 602 selects a function f_x( ) of a node Nx from the function group F (S1602).

Then, the first associating unit 602 registers a node name of the node Nx and the selected function f_x( ) on the function list 800 in a manner to associate the node name with the selected function f_x( ) (S1603). Here, the node name of the node Nx and the function f_x( ) are registered as last function information 800-$n$ of the function list 800.

Subsequently, the second associating unit 603 acquires a rate c_x of the node Nx included in the node determination instruction. Then, the second associating unit 603 registers the node name of the node Nx and the rate c_x on the index value list 900 in a manner to associate the node name with the rate c_x (S1604). Here, the node name of the node Nx and the rate c_x are registered as last index value information 900-$n$ of the index value list 900.

Subsequently, the determination unit 606 initializes the node/key correspondence list 1200 (S1605). Then, the first calculation unit 604 initializes "j" of data Dj as "j=1" (S1606) and extracts a key kj and redundancy Rj of data Dj from the key list 700 (S1607).

Subsequently, the determination unit 606 performs node determination processing to determine a node Ni in which the data Dj is to be stored (S1608). Then, the first calculation unit 604 increments "j" of the data Dj (S1609) and determines whether "j" is larger than "m" or not (S1610).

When "j" is equal to or smaller than "m" (S1610: No), the procedure returns to S1607. On the other hand, when "j" is larger than "m" (S1610: Yes), the output unit 609 outputs the node/key correspondence list 1200 (S1611) and a series of processing according to this flowchart is ended.

Accordingly, a node Ni in which data D1 to data Dm are to be stored can be redetermined in node addition to the distributed data store DS. Further, when data movement occurs in associated with addition of a node Nx, data Dj is moved to the node Nx which is newly added, being able to effectively improve performance in the node addition. Here, a specific processing procedure of the node determination processing of S1608 is same as the specific processing procedure of the node determination processing of S1308 depicted in FIGS. 14 and 15, so that the description thereof is omitted.

Figure 17:
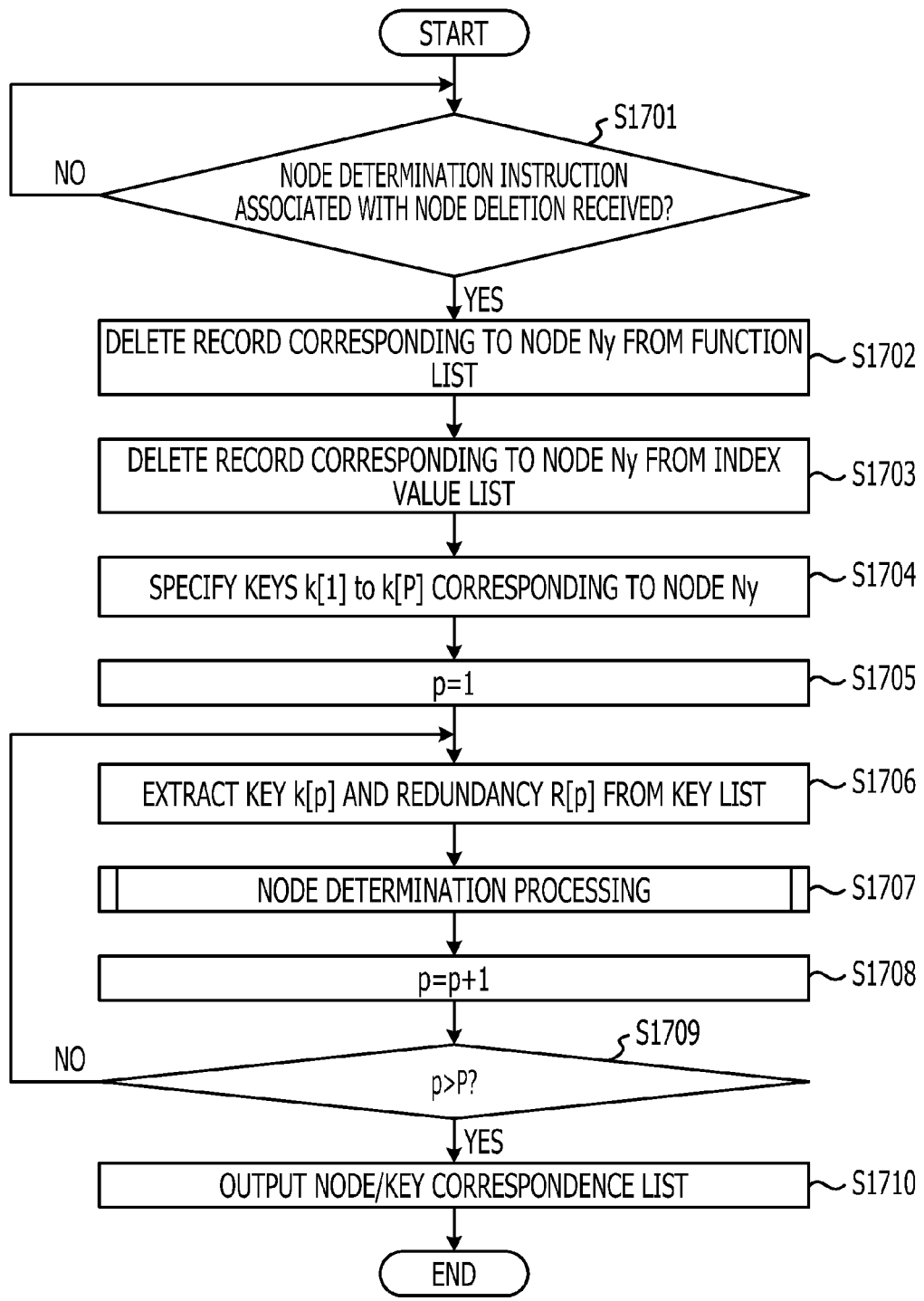
FIG. 17 is a flowchart illustrating an example of the node determination processing procedure of the node determining apparatus in node deletion.

A node determination processing procedure of the node determining apparatus 101 in node deletion is now described. In this example, a node Ni which is deleted from the distributed data store DS is described as a "node Ny". FIG. 17 is a flowchart illustrating an example of a node determination processing procedure of the node determining apparatus in node deletion.

As depicted in the flowchart of FIG. 17, the reception unit 601 first determines whether to receive a node determination instruction associated with node deletion or not (S1701). Here, the reception unit 601 waits to receive a node determination instruction (S1701: No). When the reception unit 601 receives a node determination instruction (S1701: Yes), the first associating unit 602 deletes a record corresponding to the node Ny from the function list 800 (S1702). Here, node IDs in the function list 800 are newly assigned after the record corresponding to the node Ny is deleted.

Subsequently, the second associating unit 603 deletes a record corresponding to the node Ny from the index value list 900 (S1703). Here, node IDs in the index value list 900 are newly assigned after the record corresponding to the node Ny is deleted.

Subsequently, the determination unit 606 refers to the node/key correspondence list 1200 so as to specify a key (in this example, described as keys k[1] to k[P]) corresponding to the node Ny (S1704). Then, the first calculation unit 604 initializes "p" of data Dp as "p=1" (S1705) and extracts a key k[p] and redundancy R[p] of the data Dp from the key list 700 (S1706).

Subsequently, the determination unit 606 performs node determination processing to determine a node Ni in which the data Dp is to be stored (S1707). Then, the first calculation unit 604 increments "p" of the data Dp (S1708) and determines whether "p" is larger than "P" or not (S1709).

When "p" is equal to or smaller than "P" (S1709: No), the procedure returns to S1706. On the other hand, when "p" is larger than "P" (S1709: Yes), the output unit 609 outputs the node/key correspondence list 1200 (S1710) and a series of processing according to this flowchart is ended.

Accordingly, a node Ni in which data D[1] to data D[P] which are stored in the node Ny which is to be deleted can be redetermined in the node deletion from the distributed data store DS. Here, a specific processing procedure of the node determination processing of S1707 is same as the specific processing procedure of the node determination processing of S1308 depicted in FIGS. 14 and 15, so that the description thereof is omitted here.

A specific example 1 of the node determination processing of the node determining apparatus 101 is now described. In this example, the following formula (3) is used as a function f_i( ) of a node Ni. Here, i denotes a node name of a node Ni, kj denotes a key of data Dj, and (i+kj) denotes coupling of the node name and the key as a character string.

$$f\_i(\ )=f(i,kj)=<\text{first 32 bits of SHA1}(i+kj)> \quad (3)$$

In this example, the following formula (4) is used as a weighting function g( ). Here, c_i denotes a rate related to a node Ni.

$$g(\ )=g(f(i,kj),c\_i)=f(i,kj)/c\_i \quad (4)$$

A case where the number n of nodes in the distributed data store DS is set to 5 (n=5) and a node Ni in which data D1 to D20 is to be stored is determined among nodes N1 to N5 is first described. Here, node names of the nodes N1 to N5 are respectively set to "n00", "n01", "n02", "n03", and "n04".

Further, all redundancy R1 to R20 of the respective data D1 to D20 are set to "2". Further, rates of the nodes N1 to N5 are respectively set to "1.2", "1.3", "1.3", "1.3", and "2.0". The node determining apparatus 101 determines nodes Ni corresponding to the first and second weighting function values from the head of the ascending order which is obtained by rearranging weighting function values of the nodes N1 to N5, as storage locations of the data Dj which is specified from the key kj.

Here, a key k1 of data D1 is set to "k00", and weighting function values of the nodes N1 to N5 are calculated by the node determining apparatus 101 by using the above-mentioned formulas (3) and (4). The calculated weighting function values are rearranged in ascending order as following.

$$g(f\_n04(\text{"k00"}),2.0)=0.033895$$

$$g(f\_n01(\text{"k00"}),1.3)=0.042616$$

$$g(f\_n02(\text{"k00"}),1.3)=0.151522$$

$$g(f\_n03(\text{"k00"}),1.3)=0.254016$$

$$g(f\_n00(\text{"k00"}),1.2)=0.435007$$

In this case, a node Ni of which the weighting function value is the minimum is the node N5 (node name: n04) and a node Ni of which the weighting function value is the second smallest is the node N2 (node name: n01) among the nodes N1 to N5. Accordingly, storage locations of the data D1 which is specified from the key k1 ("k00") are the nodes N5 and N2.

Next, a key k2 of data D2 is set to "k01", and weighting function values of the nodes N1 to N5 are calculated by the node determining apparatus 101 by using the above-mentioned formulas (3) and (4). The calculated weighting function values are rearranged in ascending order as following.

$$g(f\_n04("k01"),2.0)=0.441253$$

$$g(f\_n01("k01"),1.3)=0.517887$$

$$g(f\_n03("k01"),1.3)=0.547294$$

$$g(f\_n02("k01"),1.3)=0.675380$$

$$g(f\_n00("k01"),1.2)=0.686856$$

In this case, a node Ni taking the minimum weighting function value is the node N5 (node name: n04) and a node Ni taking the second smallest weighting function value is the node N2 (node name: n01) among the nodes N1 to N5. Accordingly, storage locations of the data D2 which is specified from the key k2 ("k01") are the nodes N5 and N2.

In the similar manner, when keys k3 to k20 of data D3 to D20 are respectively set to "k02" to "k19" and storage locations of respective data D3 to D20 are determined, corresponding relationships between node names and keys become as the node/key correspondence list 1800 depicted in FIG. 18.

FIG. 18 is a diagram (I) illustrating a specific example 1 of stored contents of the node/key correspondence list. As depicted in FIG. 18, a corresponding relationship between a node name and a key of each of the nodes N1 to N5 is exhibited. Here, when keys kj are distributed in accordance with rates of the nodes N1 to N5, "approximately 6.7 pieces", "approximately 7.3 pieces", "approximately 7.3 pieces", "approximately 7.3 pieces", and "approximately 11.2 pieces" of keys kj are respectively associated with the nodes N1 to N5. In the example depicted in FIG. 18, "6 pieces", "7 pieces", "10 pieces", "6 pieces", and "11 pieces" of keys kj are respectively associated with the nodes N1 to N5. Accordingly, the number of keys kj respectively associated with the nodes N1 to N5 sufficiently reflects rates of the nodes N1 to N5.

A case where the number n of nodes in the distributed data store DS is increased from 5 (n=5) to 6 (n=6) is now described. Here, a node name of a node N6 which is newly added is described as "n05".

As the above description, a key k1 of data D1 is set to "k00", and weighting function values of the nodes N1 to N6 are calculated by the node determining apparatus 101 by using the above-mentioned formulas (3) and (4). The calculated weighting function values are rearranged in ascending order as following.

$$g(f\_n04("k00"),2.0)=0.033895$$

$$g(f\_n01("k00"),1.3)=0.042616$$

$$g(f\_n05("k00"),2.5)=0.134690$$

$$g(f\_n02("k00"),1.3)=0.151522$$

$$g(f\_n03("k00"),1.3)=0.254016$$

$$g(f\_n00("k00"),1.2)=0.435007$$

In this case, a node Ni taking the minimum weighting function value is the node N5 (node name: n04) and a node Ni taking the second smallest weighting function value is the node N2 (node name: n01) among the nodes N1 to N6, in a similar manner to the case where the number n of nodes is 5 (n=5). Accordingly, storage locations of the data D1 which is specified from the key k1 ("k00") do not change.

Next, a key k2 of data D2 is set to "k01", and weighting function values of the nodes N1 to N6 are calculated by the node determining apparatus 101 by using the above-mentioned formulas (3) and (4). The calculated weighting function values are rearranged in ascending order as following.

$$g(f\_n05("k01"),2.5)=0.137733$$

$$g(f\_n04("k01"),2.0)=0.441253$$

$$g(f\_n01("k01"),1.3)=0.517887$$

$$g(f\_n03("k01"),1.3)=0.547294$$

$$g(f\_n02("k01"),1.3)=0.675380$$

$$g(f\_n00("k01"),1.2)=0.686856$$

In this case, a node Ni taking the minimum weighting function value is the node N6 (node name: n05) and a node Ni taking the second smallest weighting function value is the node N5 (node name: n04) among the nodes N1 to N6. Accordingly, storage locations of the data D2 which is specified from the key k2 ("k01") change from the nodes N5 and N2 to the nodes N6 and N5.

Figure 19:
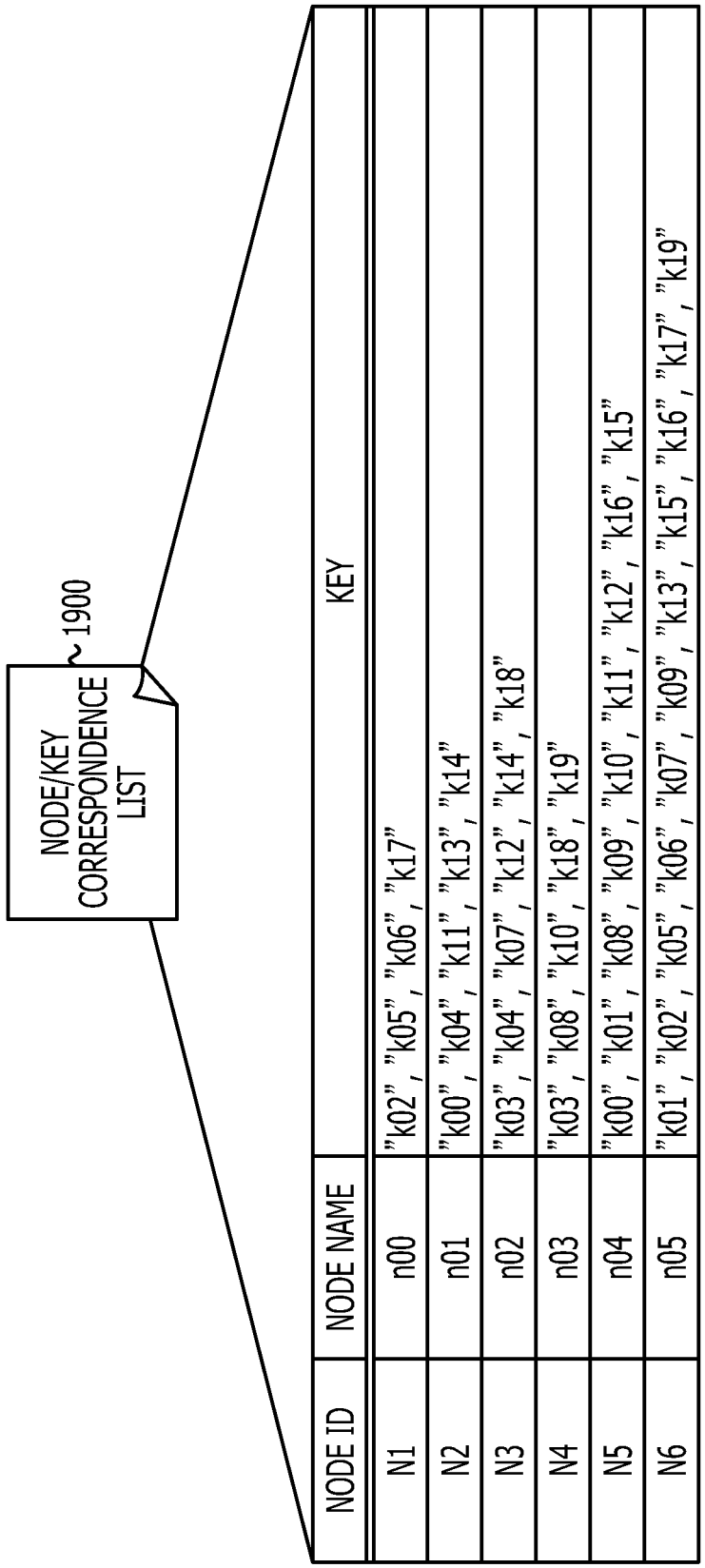
FIG. 19 is a diagram (II) illustrating the specific example 1 of stored contents of the node/key correspondence list.

In the similar manner, when keys k3 to k20 of data D3 to D20 are respectively set to "k02" to "k19" and storage locations of respective data D3 to D20 are determined, corresponding relationships between node names and keys become as the node/key correspondence list 1900 depicted in FIG. 19.

FIG. 19 is a diagram (II) illustrating a specific example 1 of stored contents of the node/key correspondence list. As depicted in FIG. 19, a corresponding relationship between a node name and a key of each of the nodes N1 to N6 is exhibited. Here, it can be said that when a total number of data Dj which moves when the number of nodes changes (that is, a total number of keys kj) is sufficiently close to "K×R×1/(n+1)", a data moving amount in the change of the number of nodes is sufficiently close to the minimum.

In this example, "K=20, R=2, n=5" are set, so that it can be said that when a total number of moving keys kj is close to "7", the data moving amount is sufficiently close to the minimum. In the example illustrated in FIG. 19, storage locations of data D2, D6, D7, D8, D10, D14, and D20 which are specified from keys "k01", "k02", "k05", "k06", "k07", "k09", "k13", "k15", "k16", "k17", and "k19" change as a result of the addition of the node N6. Accordingly, the data moving amount in the change of the number of nodes is sufficiently close to the minimum.

When keys kj are distributed in accordance with rates of the nodes N1 to N6, "approximately 5 pieces", "approximately 5.4 pieces", "approximately 5.4 pieces", "approximately 5.4 pieces", "approximately 8.3 pieces", and "approximately 10.4 pieces" of keys kj are respectively associated with the nodes N1 to N6. In the example illustrated in FIG. 19, "4 pieces", "5 pieces", "6 pieces", "5 pieces", "9 pieces", and "11 pieces" of keys kj are respectively associated with the nodes N1 to N6. Accordingly, the number of keys kj which are respectively associated with the nodes N1 to N6 sufficiently reflects the rates of the nodes N1 to N6.

A specific example 2 of the node determination processing of the node determining apparatus 101 is now described. In this example, the above-mentioned formula (3) is used as a function f_i( ) of a node Ni. Here, i denotes a node name of a node Ni, kj denotes a key of data Dj, and (i+kj) denotes coupling of the node name and the key as a character string. In this example, the following formula (5) is used as a weighting function g( ). Here, c_i denotes a rate related to a node Ni. Here, "f(i,kj)^c_i" expresses a formula in which f(i,kj) is exponentiated by c_i.

$$g(\ )=g(f(i,kj),c\_i)=f(i,kj)^{c\_i} \quad (5)$$

A case where the number n of nodes in the distributed data store DS is set to 5 (n=5) and a node Ni in which data D1 to D20 are to be stored is determined among nodes N1 to N5 is first described. Here, node names of the nodes N1 to N5 are respectively set to "n00", "n01", "n02", "n03", and "n04".

Further, all redundancy R1 to R20 of the respective data D1 to D20 are set to "2". Further, rates of the nodes N1 to N5 are respectively set to "1.2", "1.3", "1.3", "1.3", and "2.0". The node determining apparatus 101 determines nodes Ni corresponding to the first and second weighting function values from the head of the ascending order which is obtained by rearranging weighting function values of the nodes N1 to N5, as storage locations of the data Dj which is specified from the key kj.

Here, a key k1 of data D1 is set to "k00", and weighting function values of the nodes N1 to N5 are calculated by the node determining apparatus 101 by using the above-mentioned formulas (3) and (5). The calculated weighting function values are rearranged in ascending order as following.

$$g(f\_n04("k00"),2.0)=0.004595$$

$$g(f\_n01("k00"),1.3)=0.023258$$

$$g(f\_n02("k00"),1.3)=0.120988$$

$$g(f\_n03("k00"),1.3)=0.236834$$

$$g(f\_n00("k00"),1.2)=0.458367$$

In this case, a node Ni taking the minimum weighting function value is the node N5 (node name: n04) and a node Ni taking the second smallest weighting function value is the node N2 (node name: n01) among the nodes N1 to N5. Accordingly, storage locations of the data D1 which is specified from the key k1 ("k00") are the nodes N5 and N2.

Next, a key k2 of data D2 is set to "k01", and weighting function values of the nodes N1 to N5 are calculated by the node determining apparatus 101 by using the above-mentioned formulas (3) and (5). The calculated weighting function values are rearranged in ascending order as following.

$$g(f\_n01("k01"),1.3)=0.597905$$

$$g(f\_n03("k01"),1.3)=0.642411$$

$$g(f\_n04("k01"),2.0)=0.778818$$

$$g(f\_n00("k01"),1.2)=0.792969$$

$$g(f\_n02("k01"),1.3)=0.844382$$

In this case, a node Ni taking the minimum weighting function value is the node N2 (node name: n01) and a node Ni taking the second smallest weighting function value is the node N4 (node name: n03) among the nodes N1 to N5. Accordingly, storage locations of the data D2 which is specified from the key k2 ("k01") are the nodes N2 and N4.

Figure 20:
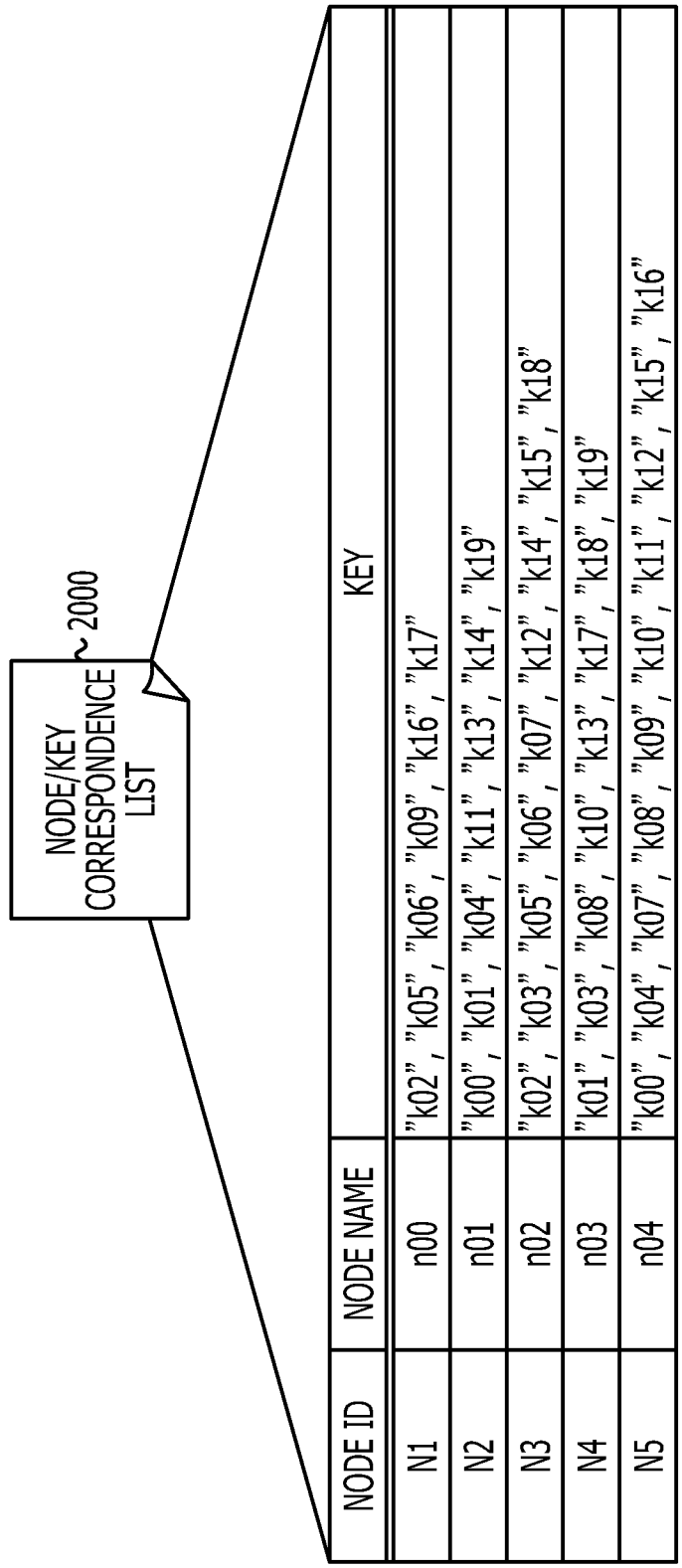
FIG. 20 is a diagram (I) illustrating a specific example 2 of stored contents of a node/key correspondence list.

In the similar manner, when keys k3 to k20 of data D3 to D20 are respectively set to "k02" to "k19" and storage locations of respective data D3 to D20 are determined, corresponding relationships between node names and keys become as the node/key correspondence list 2000 depicted in FIG. 20.

FIG. 20 is a diagram (I) illustrating a specific example 2 of stored contents of the node/key correspondence list. As depicted in FIG. 20, a corresponding relationship between a node name and a key of each of the nodes N1 to N5 is exhibited. Here, when keys kj are distributed in accordance with rates of the nodes N1 to N5, "approximately 6.7 pieces", "approximately 7.3 pieces", "approximately 7.3 pieces", "approximately 7.3 pieces", and "approximately 11.2 pieces" of keys kj are respectively associated with the nodes N1 to N5. In the example depicted in FIG. 20, "6 pieces", "7 pieces", "9 pieces", "8 pieces", and "10 pieces" of keys kj are respectively associated with the nodes N1 to N5. Accordingly, the number of keys kj respectively associated with the nodes N1 to N5 sufficiently reflects rates of the nodes N1 to N5.

A case where the number n of nodes in the distributed data store DS is increased from 5 (n=5) to 6 (n=6) is now described. Here, a node name of a node N6 which is newly added is described as "n05".

As the above description, a key k1 of data D1 is set to "k00", and weighting function values of the nodes N1 to N6 are calculated by the node determining apparatus 101 by using the above-mentioned formulas (3) and (5). The calculated weighting function values are rearranged in ascending order as following.

$$g(f\_n04("k00"),2.0)=0.004595$$

$$g(f\_n01("k00"),1.3)=0.023258$$

$$g(f\_n05("k00"),2.5)=0.065794$$

$$g(f\_n02("k00"),1.3)=0.120988$$

$$g(f\_n03("k00"),1.3)=0.236834$$

$$g(f\_n00("k00"),1.2)=0.458367$$

In this case, a node Ni taking the minimum weighting function value is the node N5 (node name: n04) and a node Ni taking the second smallest weighting function value is the node N2 (node name: n01) among the nodes N1 to N6, in a similar manner to the case where the number n of nodes is 5 (n=5). Accordingly, storage locations of the data D1 which is specified from the key k1 ("k00") do not change.

Next, a key k2 of data D2 is set to "k01", and weighting function values of the nodes N1 to N6 are calculated by the node determining apparatus 101 by using the above-mentioned formulas (3) and (5). The calculated weighting function values are rearranged in ascending order as following.

$$g(f\_n05("k01"),2.5)=0.069574$$

$$g(f\_n01("k01"),1.3)=0.597905$$

$$g(f\_n03("k01"),1.3)=0.642411$$

$$g(f\_n04("k01"),2.0)=0.778818$$

$$g(f\_n00("k01"),1.2)=0.792969$$

$$g(f\_n02("k01"),1.3)=0.844382$$

In this case, a node Ni taking the minimum weighting function value is the node N6 (node name: n05) and a node Ni taking the second smallest weighting function value is the node N2 (node name: n01) among the nodes N1 to N6. Accordingly, storage locations of the data D2 which is specified from the key k2 ("k01") change from the nodes N2 and N4 to the nodes N6 and N2.

Figure 21:
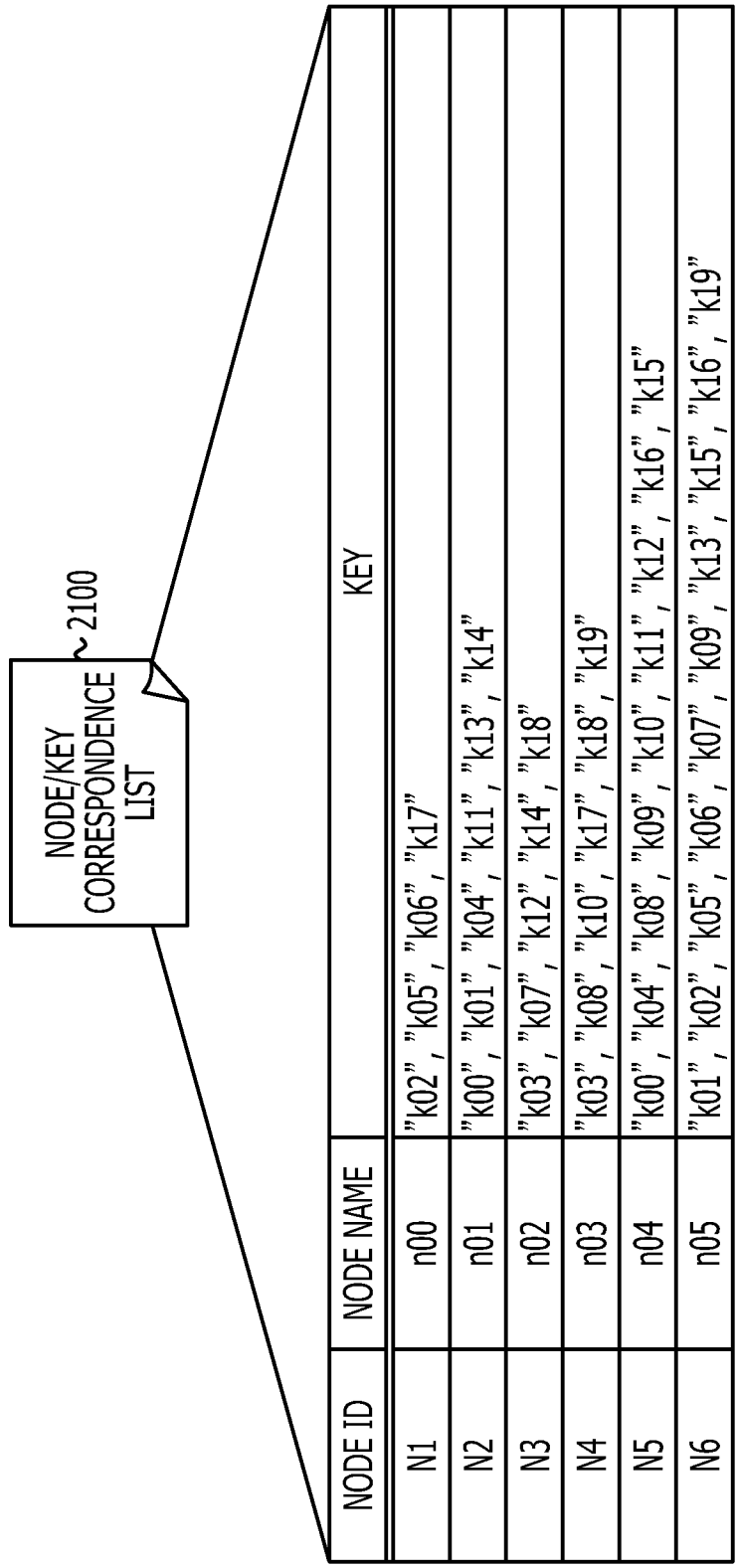
FIG. 21 is a diagram (II) illustrating the specific example 2 of stored contents of the node/key correspondence list.

In the similar manner, when keys k3 to k20 of data D3 to D20 are respectively set to "k02" to "k19" and storage locations of respective data D3 to D20 are determined, corresponding relationships between node names and keys become as the node/key correspondence list 2100 depicted in FIG. 21.

FIG. 21 is a diagram (II) illustrating a specific example 2 of stored contents of the node/key correspondence list. As depicted in FIG. 21, a corresponding relationship between a node name and a key of each of the nodes N1 to N6 is exhibited. Here, it can be said that when a total number of data Dj which moves when the number of nodes changes (that is, a total number of keys kj) is sufficiently close to "K×R×1/(n+1)", a data moving amount in the change of the number of nodes is sufficiently close to the minimum.

In this example, "K=20, R=2, n=5" are set, so that it can be said that when a total number of moving keys kj is close to "7", the data moving amount is sufficiently close to the minimum. In the example illustrated in FIG. 21, storage locations of data D2, D3, D6, D7, D8, D10, D14, D16, D17, and D20 which are specified from keys "k01", "k02", "k05", "k06", "k07", "k09", "k13", "k15", "k16", and "k19" change as a result of the addition of the node N6. Accordingly, the data moving amount in the change of the number of nodes is sufficiently close to the minimum.

When keys kj are distributed in accordance with rates of the nodes N1 to N6, "approximately 5 pieces", "approximately 5.4 pieces", "approximately 5.4 pieces", "approximately 5.4 pieces", "approximately 8.3 pieces", and "approximately 10.4 pieces" of keys kj are respectively associated with the nodes N1 to N6. In the example illustrated in FIG. 21, "4 pieces", "6 pieces", "5 pieces", "6 pieces", "9 pieces", and "10 pieces" of keys kj are respectively associated with the nodes N1 to N6. Accordingly, the number of keys kj which are respectively associated with the nodes N1 to N6 sufficiently reflects the rates of the nodes N1 to N6. By employing the above-mentioned formula (5) as a weighting function g( ) the number of keys kj which are respectively associated with the nodes N1 to N6 can be set to the number following the rates of the nodes N1 to N6 when the number of distributed data is sufficiently large.

As described above, according to the node determining apparatus 101 of the embodiment, different functions f_i( ) are prepared for respective nodes Ni and a function value f_i(k) is calculated by inputting a key kj of data Dj as an argument. Further, the node determining apparatus can determine a node Ni in which data Dj is to be stored, from a size relationship of weighting function values g(f_i(k),c_i) which are obtained by inputting a function value f_i(k) and a rate c_i of a node Ni as arguments. Accordingly, the number of data Dj which is to be stored in a node Ni corresponds to a value of a rate c_i. Therefore, more data Dj can be stored by a node Ni having large storage capacity or a node Ni exhibiting high processing speed, depending on setting of a rate c_i. As a result, efficiency of the distributed data store DS can be more promoted while avoiding imposing excessive loads on a node Ni having small storage capacity or a node Ni exhibiting slow processing.

The node determining apparatus 101 can determine a node Ni in which data Dj is to be stored, from a size relationship of weighting function values g(f_i(k),c_i) which are obtained by inputting a function value f_i(k) and a rate c_i of a node Ni as arguments. Accordingly, the size relationship of weighting function values g(f_i(k),c_i) among original nodes does not change even if the number of nodes is increased/decreased, so that data Dj does not move among nodes other than a node Ni which is added or deleted, thereafter.

The node determining apparatus 101 can determine the predetermined number of nodes Ni in which data Dj is to be stored, in accordance with an order obtained after rearranging weighting function values g(f_i(k),c_i) of respective nodes Ni based on the size relationship. Accordingly, the data Dj can be redundantly stored in Rj pieces of nodes Ni, being able to improve a failure resistance property of the distributed data store DS. Further, in a case where data Dj is redundantly stored in Rj pieces of nodes Ni as well, the size relationship of weighting function values g(f_i(k),c_i) among original nodes does not change even if the number of nodes is increased/decreased, so that the data Dj does not move among nodes other than a node Ni which is added or deleted, thereafter.

The node determining apparatus 101 can determine a node Ni in which data Dj is to be stored in accordance with a weighting function g( ) by using a pair of a node name and a function f_i( ) of each node Ni. Therefore, an information amount for determining a storage location of data Dj can be reduced compared to a method in which nodes Ni for storing data Dj are managed for every key kj so as to determine a node Ni in which the data Dj is to be stored. Further, in a case where a function f( ) taking two arguments as the above-mentioned formula (1) is used, a node Ni in which data Dj is to be stored can be determined by using a function f( ) and a node name of each node Ni, being able to further reduce the information amount.

According to the node determining apparatus 101, function values f_i(kj) which are arguments of weighting functions g( ) can be evenly distributed by using a function of which frequency distribution of function values is sufficiently even, as the function f_i( ). Accordingly, disproportionate assignment of storage locations of data Dj depending on a value of a key kj does not occur.

According to the node determining apparatus 101, function values f_i(kj) which are arguments of weighting functions g( ) of a case where data Dj is redundantly stored can be evenly distributed by using functions of which frequency distribution of function values is sufficiently even, as functions f_1( ) to f_n( ). Accordingly, disproportionate assignment of storage locations in which data Dj is made redundant depending on a value of a key kj does not occur. Accordingly, in a case where data Dj is redundantly stored in the node N1 to N3, for example, such situation that a load is imposed on the nodes N2 and N3 whenever the node N1 has a failure can be avoided.

According to the node determining apparatus 101, a function of which a weighting function value g(f_i(k),c_i) increases or a function of which a weighting function value g(f_i(k),c_i) decreases in accordance with increase of a function value f_i(k) which is an argument is employed as a weighting function g( ). According to the node determining apparatus 101, a function of which a weighting function value g(f_i(k),c_i) increases or a function of which a weighting function value g(f_i(k),c_i) decreases in accordance with increase of an index value which is an argument is employed as a weighting function g( ). Accordingly, a weighting function value g(f_i(k),c_i) can be calculated while reflecting an index value c_i of each node Ni and data Dj can be distributed to be stored in respective nodes Ni of the distributed data store DS in accordance with an index value c_i of each node Ni.

According to the node determining apparatus 101, as the weighting function g( ), such function can be employed that weighting function values g(f_i(k),c_i) of any node Ni becomes the maximum or the minimum at a rate of an index value c_i of any node Ni with respect to a sum of index values c_i of respective nodes Ni, in a size relationship of values of the weighting function which is defined within a range of the weighting function. Accordingly, a weighting function value g(f_i(k),c_i) can be calculated while reflecting an index value c_i of each node Ni and data Dj can be distributed to be stored in respective nodes Ni of the distributed data store DS in accordance with an index value c_i of each node Ni.

The node determining method described in this embodiment can be realized by executing a predetermined program by a computer such as a personal computer and a work station. The node determining program of the embodiment is recorded in a recording medium, which can be read by a computer, such as hard disk, a flexible disk, a CD-ROM, an MO, and a DVD and is read out by the computer from the recording medium so as to be executed. The node determining program of the embodiment can be distributed via a network such as Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a processor included in a node determining apparatus to execute an operation, the operation comprising:

setting a weighting value for each of a plurality of nodes coupled to the node determining apparatus so as to store more data to a node having higher performance, the plurality of nodes being server nodes;

storing different data in the plurality of nodes based on a predetermined order determined based on the weighting value;

determining a weighting value for a new node when the new node is to be added to the plurality of nodes based on a performance of the new node;

updating an order of the weighting value for each of the plurality of nodes based on the weighting value for each of the plurality of nodes and the weighting value of the new node; and causing the different data stored in the plurality of nodes to move to the new node without making movement of data between the plurality of nodes occur, based on the order of the weighting value for the new node.

2. The non-transitory computer readable storage medium according to claim 1, wherein the operation further comprises:

associating a mathematical function, the mathematical function differing for every node included in the plurality of nodes, of which a domain includes a key to uniquely specify data to be stored, with each node; and associating an index value of each node, the index value indicating an amount of data to be stored, with each node, and wherein the determining includes:

substituting the key in the mathematical function of each node so as to calculate a value of the mathematical function of each node; and substituting the value of the mathematical function of each node and the index value of each node in the weighting value, of which a domain includes a combination of the value of the mathematical function of each node and the index value of each node and in which a size relationship of values of the weighting value is defined in a range of the weighting value, so as to calculate the weighting value for every node, and wherein the updating includes:

obtaining a determination result by determining a node in which the data is to be stored from the plurality of nodes, based on the size relationship of the weighting value of each node; and outputting the determination result.

3. The non-transitory computer readable storage medium according to claim 2, wherein the operation further comprises:

rearranging the weighting value of each node based on the size relationship of the weighting value of each node; and selecting a predetermined number of nodes from the plurality of nodes in accordance with an order of the rearranged values of the weighting value of each node; wherein the determining of the node includes determining the predetermined number of selected nodes as nodes in which the data is to be stored.

4. The non-transitory computer readable storage medium according to claim 2, wherein the operation further comprises:

performing the respective processing for every data that is stored in the plurality of nodes, in a case where a new node is added to the plurality of nodes.

5. The non-transitory computer readable storage medium according to claim 2, wherein the operation further comprises:

in a case where a node is deleted from the plurality of nodes, performing the respective processing for every data that is stored in the node.

6. The non-transitory computer readable storage medium according to claim 2, wherein the function is a mathematical function by which a fixed length random number can be obtained by inputting the key as an argument.

7. The non-transitory computer readable storage medium according to claim 2, wherein the weighting value is a mathematical function of which a value is increased as the index value is increased or a mathematical function of which a value is decreased as the index value is increased.

8. The non-transitory computer readable storage medium according to claim 2, wherein the size relationship of the values of the weighting value, the size relationship being defined in a range of the weighting value, is a relationship that a value of the weighting value of any node becomes the maximum or the minimum at a rate of an index value of any node with respect to a sum of index values of respective nodes.

9. A node determining apparatus that determines a node in which data is to be stored from a plurality of nodes, the node determining apparatus comprising:

a memory, and a processor coupled to the memory and configured to:

set a weighting value for each of the plurality of nodes coupled to the node determining apparatus so as to store more data to a node having higher performance, the plurality of nodes being server nodes, store different data in the plurality of nodes based on a predetermined order determined based on the weighting value, determine a weighting value for a new node when the new node is to be added to the plurality of nodes based on a performance of the new node, update an order of the weighting value for each of the plurality of nodes based on the weighting value for each of the plurality of nodes and the weighting value of the new node, and cause the different data stored in the plurality of nodes to move to the new node without making movement of data between the plurality of nodes occur, based on the order of the weighting value for the new node.

10. A node determining method to determine a node in which data is to be stored from a plurality of nodes, the node determining method being executed by a processor, the node determining method comprising:

setting a weighting value for each of a plurality of nodes coupled to the node determining apparatus so as to store more data to a node having higher performance, the plurality of nodes being server nodes;

storing different data in the plurality of nodes based on a predetermined order determined based on the weighting value;

determining a weighting value for a new node when the new node is to be added to the plurality of nodes based on a performance of the new node;

updating an order of the weighting value for each of the plurality of nodes based on the weighting value for each of the plurality of nodes and the weighting value of the new node; and causing the different data stored in the plurality of nodes to move to the new node without making movement of data between the plurality of nodes occur, based on the order of the weighting value for the new node.

* * * * *